(12) United States Patent
Handa et al.

(10) Patent No.: US 9,507,751 B2
(45) Date of Patent: Nov. 29, 2016

(54) MANAGING SEED DATA

(71) Applicant: Oracle International Corporation, Redwood Shores, CA (US)

(72) Inventors: Ankur Handa, Santa Clara, CA (US); Xiaojun Chen, Suzhou (CN); Venkat Srinivas, Secunderabad (IN); Ramrajesh Ravichandran, Hyderabad (IN); Jagdesh Veerapandian, Hyderabad (IN); Vijay Pandya, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 527 days.

(21) Appl. No.: 14/062,850

(22) Filed: Oct. 24, 2013

(65) Prior Publication Data
US 2015/0081832 A1  Mar. 19, 2015

Related U.S. Application Data

(60) Provisional application No. 61/880,165, filed on Sep. 19, 2013.

(51) Int. Cl.
*G06F 15/167* (2006.01)
*G06Q 10/10* (2012.01)
*H04L 9/08* (2006.01)
*H04L 29/06* (2006.01)

(52) U.S. Cl.
CPC ............. *G06F 15/167* (2013.01); *G06Q 10/10* (2013.01); *H04L 9/0869* (2013.01); *H04L 63/0428* (2013.01)

(58) Field of Classification Search
None
See application file for complete search history.

(56) References Cited

U.S. PATENT DOCUMENTS

| 5,668,947 | A | 9/1997 | Batcher | |
|---|---|---|---|---|
| 5,915,086 | A * | 6/1999 | Buzsaki | G06F 21/6218 726/28 |
| 7,062,511 | B1 * | 6/2006 | Poulsen | G06F 17/30873 |
| 7,079,653 | B2 * | 7/2006 | Scheidt | H04L 9/0869 380/258 |
| 7,792,800 | B1 | 9/2010 | Carson, Jr. | |
| 2005/0114315 | A1 | 5/2005 | Tanner | |

(Continued)

OTHER PUBLICATIONS

"Creating and Editing Seed Data by jgardner," SOASTA CloudLink Community Knowledge Base [online], 2011, [retrieved on Oct. 16, 2013], retrieved from the internet: <URL: http://cloudlink.soasta.com/t5/Knowledge-Base/Creating-and-Editing-Seed-Data/ba-p/672>, 3 pages.

(Continued)

*Primary Examiner* — Ninos Donabed
(74) *Attorney, Agent, or Firm* — Kilpatrick Townsend & Stockton LLP

(57) ABSTRACT

Embodiments of the invention provide systems and methods for managing seed data in a computing system (e.g., middleware computing system). A disclosed server computer may include a processor and a memory coupled with and readable by the processor and storing therein a set of instructions which, when executed by the processor, cause the processor to perform a method. The method may include obtaining first input data via a graphical interface. The first input data indicates a first memory storage location of seed data. The seed data comprises data to initialize an application for operation. The method further includes accessing the seed data from the first memory storage location based on the first input data. The method includes storing data based on the seed data to a second memory storage location.

16 Claims, 18 Drawing Sheets

(56) References Cited

U.S. PATENT DOCUMENTS

| | | | | |
|---|---|---|---|---|
| 2005/0262093 | A1* | 11/2005 | Beartusk | G06Q 10/10 |
| 2005/0262094 | A1* | 11/2005 | Beartusk | G06Q 10/10 |
| 2005/0262185 | A1* | 11/2005 | Beartusk | H04L 12/1813 709/202 |
| 2006/0004690 | A1* | 1/2006 | Beartusk | G06Q 10/10 |
| 2006/0004717 | A1* | 1/2006 | Ramarathnam | G06F 17/30864 |
| 2006/0010125 | A1* | 1/2006 | Beartusk | G06Q 10/10 |
| 2006/0031497 | A1* | 2/2006 | Beartusk | G06Q 10/10 709/225 |
| 2009/0254515 | A1* | 10/2009 | Terheggen | G06F 17/3002 |
| 2009/0254643 | A1* | 10/2009 | Terheggen | G06F 17/3005 709/223 |
| 2010/0217719 | A1* | 8/2010 | Olsen | B26D 5/00 705/318 |
| 2010/0223212 | A1* | 9/2010 | Manolescu | G06Q 10/06 706/12 |
| 2011/0231919 | A1* | 9/2011 | Vangpat | H04L 63/0815 726/8 |
| 2012/0023405 | A1* | 1/2012 | Hyman | G06F 17/30743 715/716 |
| 2012/0041989 | A1 | 2/2012 | Banahatti | |
| 2013/0054626 | A1* | 2/2013 | Kuehler | G06F 17/30563 707/756 |

OTHER PUBLICATIONS

"Seed Data," ASCIIcasts Episode 179 [online], original Railscast Sep 14, 2009, [retrieved on Oct. 16, 2013], retrieved from the internet: <URL: http://asciicasts.com/episodes/179-seed-data>, 5 pages.

* cited by examiner

MANAGING SEED DATA

CLAIM OF PRIORITY

The present application claims priority and benefit from U.S. Provisional Application No. 61/880,165, filed Sep. 19, 2013, entitled "MANAGING SEED DATA", the entire contents of which is incorporated herein by reference for all purposes.

TECHNICAL FIELD

Embodiments of the present invention relate generally to methods and systems for managing seed data.

BACKGROUND

Computing systems ranging from small software applications systems to large scale enterprise computing systems may utilize data (e.g., seed data) to operate a data management system. Often times, vendors of software applications or computing systems may provide seed data with a product to support implementation of the product. Some products may ship a significant volume of seed data, which can vary in file format, structure, and content.

Users who administer an enterprise computing systems (e.g., middleware computing systems) are faced with an overwhelming task to manage the seed data for use with different applications. To complicate matters further, enterprise computing systems may be formed from a combination of software and hardware products that have their own seed data, which may be formatted or stored differently. Such systems add complexity to manipulation and modification seed data to operate these systems. Often seed data may have to be migrated from one data source (e.g., a database, a memory storage device, or a file) to another data source. What is needed is a computing system that reduces time and effort for management of seed data.

BRIEF SUMMARY

Embodiments of the present invention are directed to systems and methods for managing seed data. More specifically, the disclosed system and methods provide a graphical interface (GI) (e.g., a seed data management tool) that enables a user (e.g., a system administrator) perform management functions on seed data. Seed data may include information such as account information, configuration information, a static list of values, messages (e.g., error messages or functional messages), lookup values, transaction information, non-transactional data, database information, or a combination thereof. The seed data may be used for initialization, development, testing, training, production, execution of one or more applications, or operation of a data management system. Seed data may be used by an application during any phase in a lifecycle of the application.

In disclosed embodiments, a seed data management GI may include functions such as accessing seed data, updating seed data, editing seed data, deleting seed data, splitting seed data, migrating seed data, extracting seed data, cleaning seed data, checking seed data, uploading seed data, exporting seed data, or comparing seed data. The GI enables the management functions to be performed on seed data which can be located in multiple data sources (e.g., a memory storage device, a database, or a memory file system) and/or can be stored in different formats (e.g., an extended markup language format, a comma-separated values format, a Microsoft Excel® format, a flat file format, or a database-specific format). The data sources containing the seed data may be located in data sources that are physically separated (e.g., different physical locations), such as in a networked computing environment. As such, the GI enables seed data located in one data source to be migrated, or moved, to another data source. Additionally, or in the alternative, that data sources involved in management functions of the GI may be associated with different management systems provided by different vendors.

In particular embodiments, the GI may include features and elements for management of a seed data associated with a particular data source and/or application. For example, the GI may include one or more interactive elements (e.g., selectable controls or selectable fields) that enable a user to specify seed data based on an identifier associated with a data source (e.g., a database). The interactive elements may enable a user to identify seed data based on information identifying an application (e.g., an application name, an application module, or an application path) that uses the seed data.

At least some embodiments include features and elements in the GI for specifying a portion of seed data in a data source to be managed. To illustrate, the GI may include interactive elements to specify a view object (e.g., a database view object) that indicates queries for identifying specific data within the seed data to be managed. The interactive elements for specifying a partition and/or a category within a data model (e.g., a logical business area) of seed data enable identification of logical associations or groups of seed data to be managed. In some embodiments, the GI may include interactive elements for specifying criteria, such as a specific string, used to locate seed data that satisfies the criteria.

A GI that includes these and other disclosed features improve efficiency for operation of a computing system that relies on seed data from multiple data sources. The GI enables a user to manage seed data from different sources within a single point of control (e.g., a seed data management GI). As a result, the user eliminates an effort to access individual data sources, some of which may be located in different computing environments and different physical locations, which may have to be migrated or loaded into a local environment for management. Time spent modifying specific seed data in a data source may be reduced through use of the GI which provides a user with the ability to specify criteria for locating specific seed data to be managed. The ability to manipulate or modify data in different formats increases productivity of users (e.g., developers) working with seed data in a middleware computing environment.

According to one embodiment, a method includes obtaining, by a server computer, first input data via a GI. The first input data indicates a first memory storage location of seed data. The seed data comprises data to initialize an application for operation. The method includes accessing the seed data from the first memory storage location based on the first input data. The method includes storing data based on the seed data to a second memory storage location.

In another embodiment, a computing system is disclosed that includes a processor and a memory coupled with and readable by the processor and storing therein a set of instructions which, when executed by the processor, cause the processor to perform a method. The method includes obtaining first input data via a GI. The first input data indicates a first memory storage location of seed data. The seed data comprises data to initialize an application for operation. The method includes accessing the seed data from the first memory storage location based on the first input data. The method includes storing data based on the seed data to a second memory storage location.

In yet another embodiment, a computer-readable memory is disclosed including a set of instructions stored thereon which, when executed by a processor, cause the processor to perform a method. The method includes obtaining, by a server, first input data via a GI. The first input data indicates a first memory storage location of seed data. The seed data comprises data to initialize an application for operation. The method includes accessing the seed data from the first memory storage location based on the first input data. The method includes storing data based on the seed data to a second memory storage location.

These and other embodiments of the invention are described in further detail below.

BRIEF DESCRIPTION OF THE DRAWINGS

Like reference numbers and designations in the various drawings indicate like elements.

DETAILED DESCRIPTION

Figure 1:
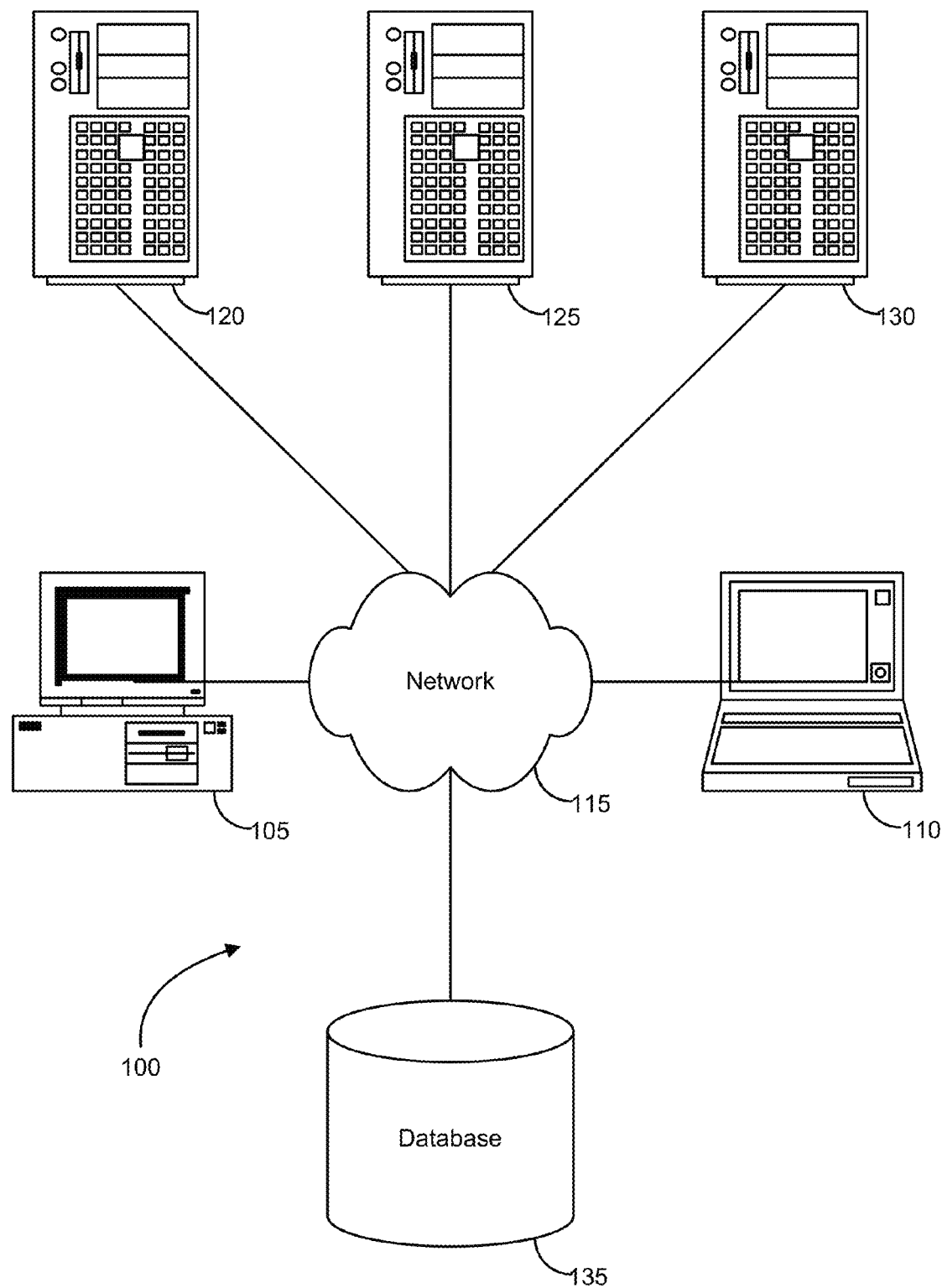
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide a system that enables one (e.g., an administrator of a data management system) to manage (e.g., update, edit, delete, compare, or format) all aspects of seed data via an application which may include one or more graphical interfaces. The seed data may be associated with or obtained from a plurality of types of data sources (e.g., a database, a file system, or a remote storage device). Further, the system provides features for improving ease of data migration for seed data between multiple data sources which may represent a different type of data source. Through this invention, a computing system may be designed that incorporates all or part of the seed data management system described herein which provides tools (e.g., software code or instructions) to enable creation of a customized application and/or one or more customized graphical interfaces that provide functions for management of seed data. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., a network 115 described below) and/or displaying and navigating web pages or other types of electronic documents. Although the exemplary system 100 is shown with two user computers, any number of user computers may be supported.

In some embodiments, the system 100 may also include the network 115. The network can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server (e.g., a web server computer), application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110. In particular embodiments, one or more of the server computers 120, 125, 130 may be associated with or operating in a middleware computing system. One or more of the server computers 120, 125, 130 may be configured to perform the methods as described herein.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g or Oracle 11g, that is adapted to store, update, and retrieve data in response to SQL-formatted commands.

Figure 2:
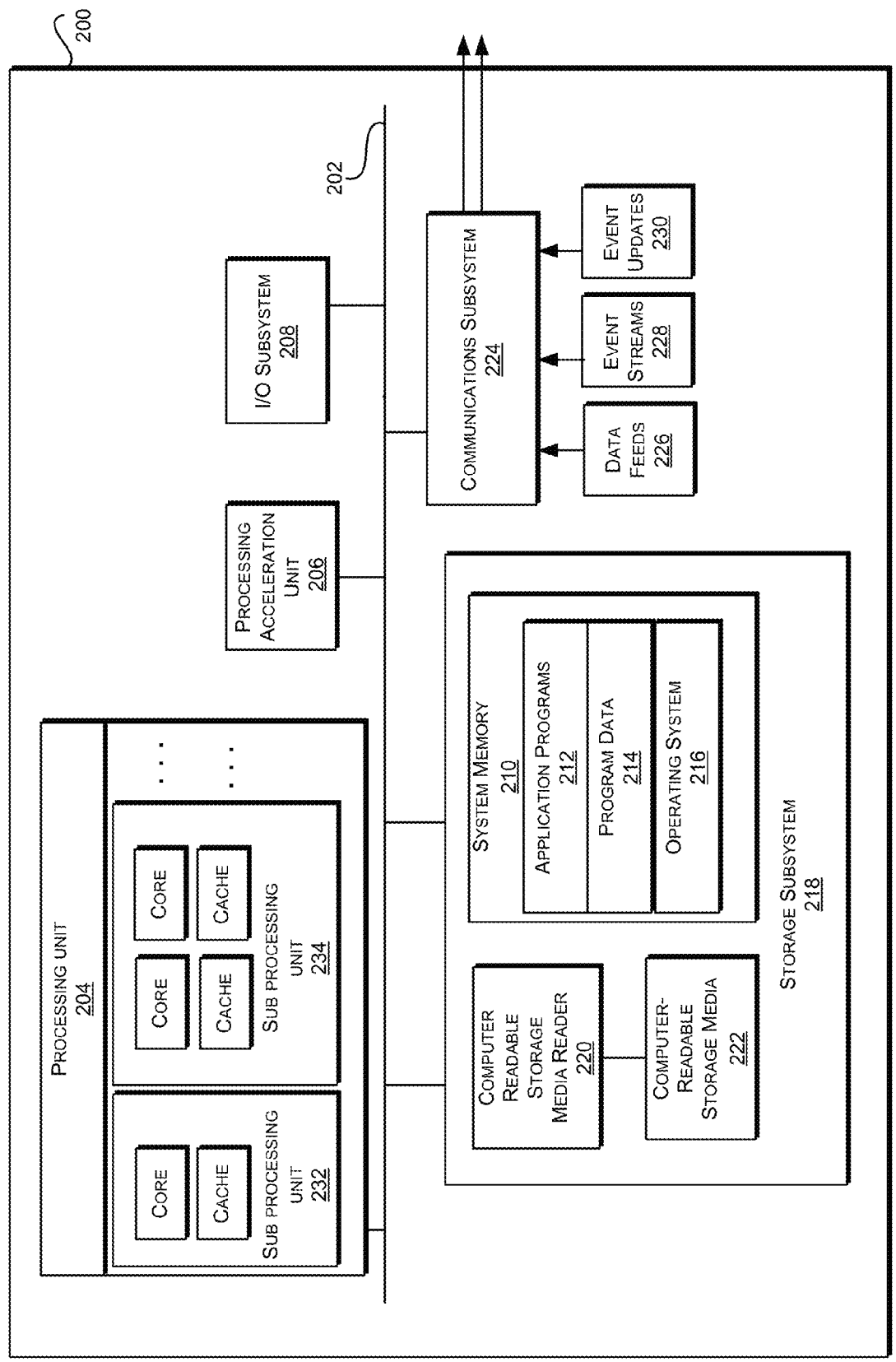
FIG. 2 illustrates an exemplary computer system, in which various embodiments of the present invention may be implemented.

FIG. 2 illustrates an exemplary computer system 200, in which various embodiments of the present invention may be implemented. The system 200 may be used to implement any of the computer systems described above. As shown in the figure, computer system 200 includes a processing unit 204 that communicates with a number of peripheral subsystems via a bus subsystem 202. These peripheral subsystems may include a processing acceleration unit 206, an I/O subsystem 208, a storage subsystem 218 and a communications subsystem 224. Storage subsystem 218 includes tangible computer-readable storage media 222 and a system memory 210.

Bus subsystem 202 provides a mechanism for letting the various components and subsystems of computer system 200 communicate with each other as intended. Although bus subsystem 202 is shown schematically as a single bus, alternative embodiments of the bus subsystem may utilize multiple buses. Bus subsystem 202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 204, which can be implemented as one or more integrated circuits (e.g., a conventional microprocessor or microcontroller), controls the operation of computer system 200. One or more processors may be included in processing unit 204. These processors may include single core or multicore processors. In certain embodiments, processing unit 204 may be implemented as one or more independent processing units 232 and/or 234 with single or multicore processors included in each processing unit. In other embodiments, processing unit 204 may also be implemented as a quad-core processing unit formed by integrating two dual-core processors into a single chip.

In various embodiments, processing unit 204 can execute a variety of programs in response to program code and can maintain multiple concurrently executing programs or processes. At any given time, some or all of the program code to be executed can be resident in processor(s) 204 and/or in storage subsystem 218. Through suitable programming, processor(s) 204 can provide various functionalities described above. Computer system 200 may additionally include a processing acceleration unit 206, which can include a digital signal processor (DSP), a special-purpose processor, and/or the like.

I/O subsystem 208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 200 may comprise a storage subsystem 218 that comprises software elements, shown as being currently located within a system memory 210. System memory 210 may store program instructions that are loadable and executable on processing unit 204, as well as data generated during the execution of these programs.

Figure 3:
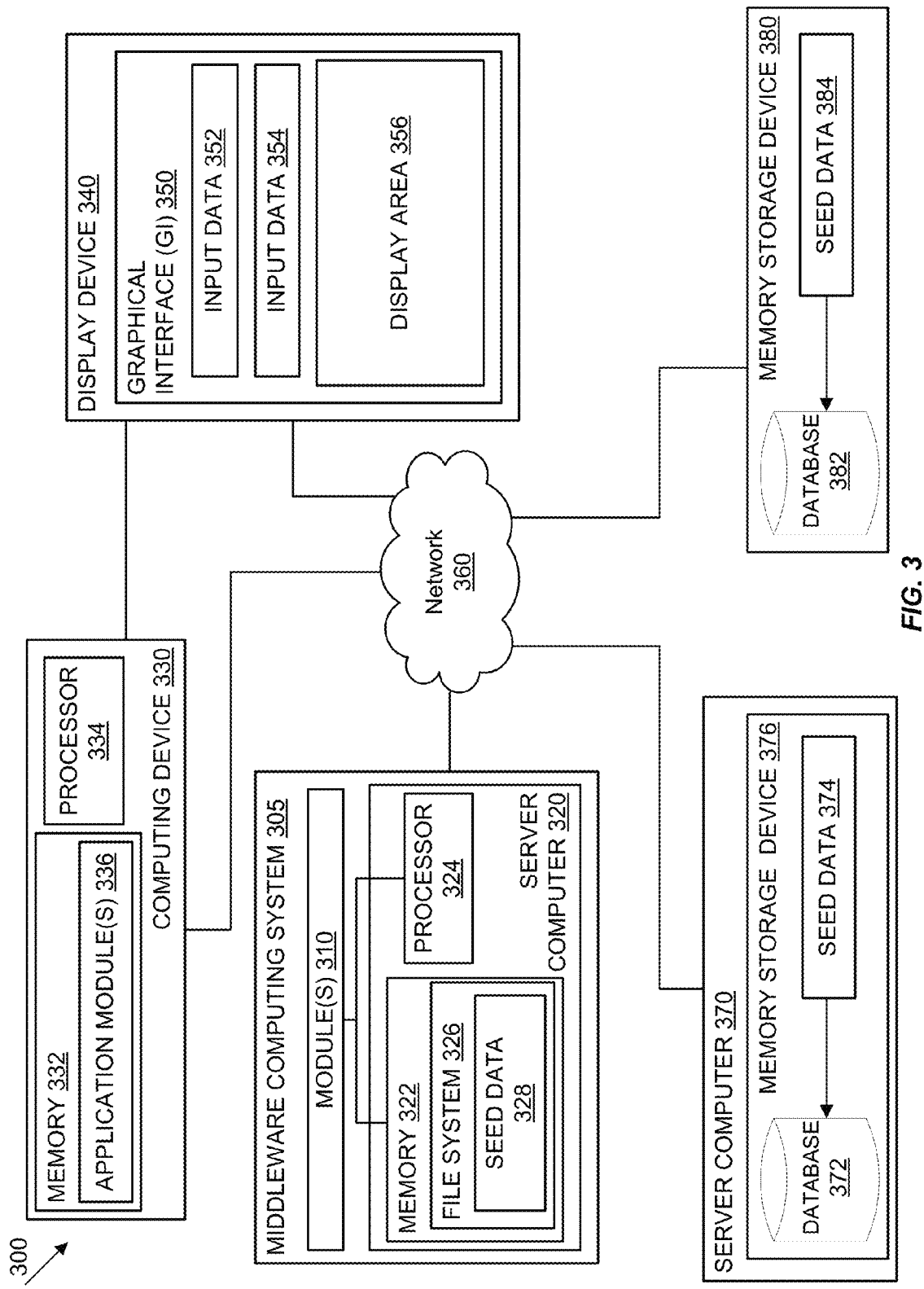
FIG. 3 is a block diagram illustrating an exemplary seed data management system in which embodiments of the present invention may be implemented.

FIG. 3 is a block diagram illustrating an exemplary seed data management system 300 in which embodiments of the present invention may be implemented. The system 300 illustrates high-level, functional components of a system for managing seed data. Seed data may include information such as account information, configuration information, a static list of values, messages (e.g., error messages or functional messages), lookup values, transaction information, non-transactional data, database information, or a combination thereof. Seed data may be used for initialization, development, testing, training, production, execution of one or more applications, or operation of a data management system. Seed data may be used by an application during any phase in a lifecycle of the application. For example, seed data may be applied during a new installation, a major or minor release upgrade, or a patch delivery. Seed data may be static in nature, but can be modified (e.g., customized) after implementation or integration of the seed data by a system. Seed data meta-data included in, or associated with seed data may enable applications to locate seed data from a memory storage location (e.g., a location in a database table). The meta-data permits data sources to maintain referential integrity to seed data in a target database. Besides the seed data, the meta-data drives how the seed data is extracted and uploaded.

Seed data may be stored in one or more types of data sources, such as a database, a memory storage device, or a file system of a computing system. Seed data may be defined by one or more formats, which may be based on a type of data source storing the seed data. The formats may include an extended markup file language (XML) format, an Adobe Flash® document in an XML-based format (XFL), a comma-separated value (CSV) file, a Microsoft Excel® file, a flat file, or other types of files that store seed data. The format may also be database-specific to store the seed data in one or more database entries of a database. The system 300 enables seed data, accessible across different data sources and different formats, to be managed via one or more graphical interfaces (GIs), such as a representative GI 350, as disclosed herein. The GI 350 may be generated by one or more devices or computing systems, such as a representative computing system 305 (e.g., a middleware computing system) and a representative computing device 330.

The middleware computing system 305 may include one or more server computers, such as a representative server computer 320 (e.g., a web server computer). The server computer 320 may perform operations for the middleware computing system 305 to manage seed data. The middleware computing system 305 may include one or more modules, such as a module 310. The module 310 may be executable in the middleware computing system 305 to perform one or more operations of the middleware computing system 305. For example, the module 310 may be executable by the server computer 320 to manage seed data. Additionally, or in the alternative, another computing device (e.g., the computing device 330) in the system 300 may execute the module 310 to perform operations for management of seed data. While the embodiment shown in FIG. 3 is implemented in the middleware computing system 305, other computing systems may be implemented that enable management of seed data to perform functions and operations of the module 310. The server computer 320 may include a memory storage device, such as a memory 322, and one or more processors, such as a processor 324. The memory 322 may be accessible to the processor 324 and may include instructions stored thereon which, when executed by the processor 324, cause the processor to perform one or more operations disclosed herein. The memory 322 may be implemented as a data source that stores seed data 328. In particular embodiments, the memory 322 may include a file system 326 that stores the seed data 328 in one or more of a plurality of file formats supported by the file system 326.

The module 310 may include instructions for generating the GI 350. In particular embodiments, the module 310 may perform instructions to enable one or more functions for management seed data to be performed via the GI 350, such as the functions described below and with respect to the FIGS. 4-17. The server computer 320 may communicate with a display device (e.g., the display device 340) via a network 360. A user may interact with the GI 350 at the display device 340. Interactions with the GI 350 may be received as input data 352, 354 at the display device 340 and may be communicated to the server computer 320 or the computing device 330 via the network 360. In at least one embodiment, the network 140, may include a local area network (LAN), a wide area network (WAN), a wireless network, and the like.

In some embodiments, one or more computing devices, such the computing device 330, may be configured to manage seed data based on interactions with the GI 350 by a user. The computing device 332 may be located externally to the middleware computing system 305, such as at a physical location different from a location of the middleware computing system 305. The computing device 330 may include a memory storage device, such as a memory 322, and one or more processors, such as a processor 334. The memory 332 may be accessible to the processor 334 and may include instructions stored thereon which, when executed by the processor 334, cause the processor to perform one or more operations disclosed herein. The memory 332 can be implemented as a data source that stores seed data.

In particular embodiments, the memory 332 may include one or more application modules, such as an application module 336, which may include instructions that are executable by the processor 334 to perform operations described as being performed by the computing device 330. For example, the application module 336 may execute one or more applications utilize seed data accessed using the GI 350. The applications may provide information and function with respect to categories such as financial management, human capital management, customer relationship management, supply chain management, procurement, governance, and project management. The application module 336 may operate based on seed data accessible from a plurality of data sources included in the middleware computing system 305 or accessible to the middleware computing system 305. In some embodiments, the computing device 330 may generate the GI 350 to enable management of seed data via the GI 350 from the computing device 330. The computing device 330 may communicate with the display device 340 directly or via the network 360 to present the GI 350 and to receive the input data 352, 354 from the display device 340 in response to interactions with the GI 350. The computing device 330 may communicate with the middleware computing system 305 via the network 360 to access to data (e.g., seed data) from the middleware computing system 305. The data may be obtained from the middleware computing system 305 may be obtained based on interaction with the GI 350.

The system 300 may include a plurality of data sources that store seed data. For example, the system 300 may include one or more server computers, such as a representative server computer 370. The server computer 370 may include one or more memory storage devices (e.g., a memory storage device 376) which store seed data 374. While the memory storage device 376 is illustrated with a database 372 that stores the seed data 374, it may be appreciated that the memory storage device 376 may include other types of data structures or file systems that are capable of storing a format of the seed data 372. The server computer 370 may be a network-type server computer that is accessible to the middleware computing system 305 and the computing device 330 via the network 360.

In another example, the system 300 may include one or more memory storage devices, such as a memory storage device 380, that is a data source which stores seed data 382. While the memory storage device 380 is illustrated with a database 382 for storing the seed data 384, the memory storage device 380 may include other types of storage structures or file systems that support a format of the seed data 382. The memory storage device 380 may be a network-type memory storage device that is accessible to the middleware computing system 305 and the computing device 330 via the network 360. Although not illustrated, at least one of the server computer 370 or the memory storage device 380 may be associated with a computing system (e.g., a data management system) that is distinct from the middleware computing system 305. The distinct computing system may be implemented or associated with products provided by a vendor that the distinct from a vendor of the middleware computing system.

The GI 350 may include one or more interactive elements (e.g., selectable control or selectable fields) for managing seed data (e.g., the seed data 328, the seed data 372, or the seed data 382). It may be appreciated that elements described or shown herein the GI 350 are for purposes of example and that fewer elements, more elements, or different graphical interface elements may be used in implementations of embodiments of the invention without departing from the underlying concepts of the invention. The one or more interactive elements may enable specification of a function for management of seed data, which are described below and in further details. The one or more interactive elements and features of the GI 350 are described below and further discussed in detail with respect to FIGS. 4-17.

The input data 352 (e.g., a first input data) and the input data 354 (e.g., a second input data) may correspond to input data received via interaction with interactive elements in the GI 350. The display device 340 may provide the input data 352 and the input data 354 to the middleware computing system 305 or the computing device 330, which use the input data 352, 354 to determine how to manage seed data.

The GI 350 may include a display area 356 that provides information about management of seed data conducted via the GI 350. In particular embodiments, the display area 356 may include a log of information corresponding to activity, instructions, commands, or other information for managing seed data based on interactions with the GI 350. In some embodiments, the display area 356 may display seed data that is managed based on interactions with the GI 350. For example, the display area 356 may display seed data that is retrieved from a data source. All of portions of the seed data may include interactive elements that enable the seed data to be modified within the display area 356 and accordingly, stored at a source of the seed data based on the modifications. In another example, the display area 356 may present seed data resulting from operations (e.g., extracted seed data) performed on seed data retrieved from a data source. These are merely illustrative of examples that describe how the display 356 functions. Embodiments described with respect to FIGS. 4-13 will provide further detail as to specific information that can be displayed in the display area 356.

Note that a graphical interface (GI) depicted in the figures may represent a web-page that is presented to a user, with the graphical interface including one or more interactive elements (such as radio buttons, drop-down menus, interactive elements, selectable controls, data entry fields) that may be selected and/or activated by a user. The display of the graphical interface may result from any suitable method, including the execution of code or instructions, interpretation of markup language, etc. by a processing element (such as a browser or other application, computer, microprocessor, central processing unit, etc.). Further, the response to (or processing of) the selection or activation of a graphical interface element may be the result of the execution of code or instructions, interpretation of markup language, etc. by a processing element (such as a browser or other application, computer, microprocessor, central processing unit, etc.). Thus, in some embodiments a method, process, function, or operation may be implemented as a result of the execution of code or a set of instructions by a suitably programmed processor or computing device.

Note that each of the figures depicting the GI and associated elements may be associated with a software-implemented process or method that is implemented by a suitably programmed processor or computing device in order to: (a) generate one or more of the depicted graphical interface elements; (b) permit a user to interact with one or more of the graphical interface elements (such as by activating an element or entering data into a data field); (c) process a user's selection or activation of a graphical interface element, or entry of data into a data field; or (d) perform one or more processes, operations or functions associated with the inventive service.

In operation, a user may access the middleware computing system 305 to manage seed data (e.g., the seed data 328, the seed data 374, and/or the seed data 384) to support operation of an application executing on the computing device 330. To manage the seed data, the user may operate the server computer 320 to cause the GI 350 to be displayed at the display device 340.

The user may interact with one or more interactive elements in the GI 350 to specify a function to be performed on particular seed data. As such, interaction with these interactive elements may cause input data (e.g., the input data 352 and/or the input data 354) to be communicated from the display device 340 to the server computer 320. The input data 352 (e.g., first input data) may indicate a memory storage location (e.g., a first memory storage location) of the seed data. The first memory storage location may correspond to a location in a memory storage device such as the memory storage device 376, the memory storage device 380, or the memory 322. The seed data may support operation of the application executing in the computing device 330. Depending on a function to perform on the seed data (e.g., a function illustrated with respect to FIGS. 4-13), the server computer 350 may receive the input data 354 (e.g., second input data) specifying additional information associated with performing a function on the seed data. For example, the second input data may indicate a second memory storage location where seed data is to be stored after performing a function. In a particular embodiment, the first memory storage location and the second memory storage location may correspond to a location in a database of a memory storage device, such as the memory 322, of the server computer 320. In another illustrative embodiment, the first memory storage location may indicate a location of a data file stored at the server computer 320 and the second memory storage location corresponds to a location in a database (e.g., the database 372) of the server computer 370.

The server computer 320 may access the seed data from the first memory storage location. All or a portion of the seed data may be presented at the GI 350 based on the function specified in the GI 350. In a particular embodiment, the second input data 354 may identify one or more attributes associated with the seed data. The seed data may be accessed based on the one or more attributes. In other embodiments, the second input data may be received from the display device after the seed data has been displayed. The second input data 354 may be based on a function performed by the user via the GI 350 after the seed data is accessed. For example, the second input data 354 may correspond to an interaction with an interactive element associated with the seed data presented in the display area 356. The second input data 354 may indicate a function to perform on the seed data.

In response to the input data (e.g., the first input data or the second input data), the server computer 320 may perform an operation on all or a portion of the seed data based on a function determined from the second input data. For example, the server computer 320 may remove one or more entries of data in the seed data based on interaction with a delete function. The server computer 320 may store data at the second memory location. In particular embodiments, the data may include the seed data that is modified. As explained earlier, the second memory storage location can be the same as the first memory storage location or different. In some embodiments, the data may include information associated with the functions performed on the seed data. In such embodiments, the second memory storage location may correspond to a location in a memory storage device where the information associated with the functions performed on the seed data. For example, the second memory storage location indicates a location in a file (e.g., a log file) stored at the server.

FIGS. 4-13 illustrate particular embodiments of a GI presented by a seed data management system. In particular embodiments, the GI's presented in the FIGS. 4-13 may be included or may be implemented in the GI 350.

1. Edit Function

Figure 4:
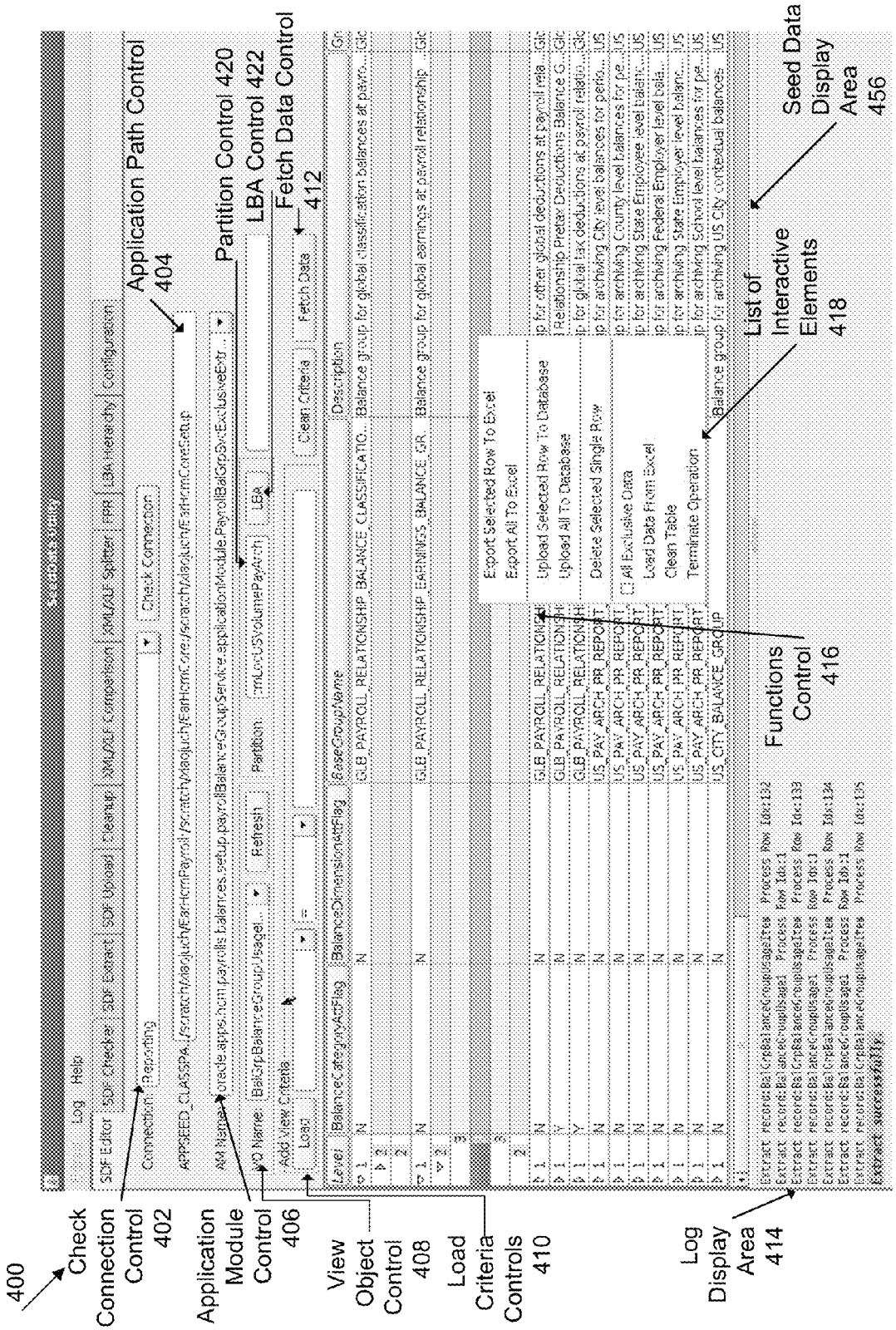
FIG. 4 shows a diagram illustrating an embodiment of a graphical interface presented by a seed data management system.

FIG. 4 is a diagram illustrating an embodiment of a GI 400 presented by a seed data management system. The GI 400 includes features and elements of an edit function (an "SDF Editor" function as illustrated in FIG. 4) provided by a seed data management system (e.g., the seed data management system 300 of FIG. 3). The edit function enables a user of the GI 400 to edit seed data accessible from one or more data sources, such as the data source 328, the memory storage device 376, or the memory storage device 380. A seed data display area 456 presented in the GI 400 may include interactive elements that enable a user to modify seed data. In some embodiments the data source from which the seed data was retrieved may be dynamically updated with the modified data. The disclosed GI 400 enables a user to update seed data via the GI 400 reduces time for modifying seed data and improves efficiency for implementation of systems that rely on seed data.

In a particular embodiment of the edit function, the GI 400 may include a plurality of interactive elements (e.g., input fields and selectable controls) to enable seed data to be edited. The input data 352 or the input data 354 described in FIG. 3 may correspond to data specified by one or more of the plurality of interactive elements in the GI 400. GI 400 may include interactive elements such as a check connection control 402, application path control 404, and application module control 406. The controls 402-406 may be used to specify information indicating an application that uses particular seed data (e.g., the seed data 328, the seed data 374, or the seed data 384). For example, the application may be a reporting application that is associated with a reporting data source. In this example, the application may be associated with an identifier (e.g., "reporting") and may use the particular seed data for reporting and analysis of financial information. Input provided via the check connection control 402 may indicate an identifier of a database connection for the edit function. The identifier may indicate a name of an application, which is used to determine the data source of the particular seed data. Further, the check connection control 402 may enable verification of a connection to a data source (e.g., the database 372 of FIG. 3 or the database 382) that is associated with the application. The application path control 404 may enable identification of a location of the application used to identify the seed data. The application module control 406 may indicate a location and/or a name of a particular application module that operates using the seed data. The seed data selected for editing may be identified as seed data associated with the application module.

The GI 400 includes may include interactive elements to further specify particular location of seed data within a data source. For example, the GI 400 includes a partition control 420, which is an interactive element that enables a user to specify a location within a data source and/or a name of the data source where seed data is located. For example, the partition control 420 may include information indicating a name of a database, or a partition in a data source where the seed data is located. The name or the partition may correspond to a memory storage location of the seed data in a data source (e.g., the database).

Additionally, the GI 400 may include interactive elements for specifying a criteria and/or categories identifying a portion of the seed data stored at the data source. For example, the GI 400 may include a view object (VO) control 408 for specifying a database view object to identify a particular portion of the seed data. The database view object may include one or more database query statements that select a particular portion of the seed data which satisfy the query statements. The VO control 408 may present a list of interactive elements, each identifying a particular VO for the seed data. Each VO identified in the VO control 408 may be obtained from an application module corresponding to the application module specified by the application module control 406. In another example, a logical business area (LBA) control 422 may be included in the GI 400. An LBA may indicate a group or category associated with an application or seed data. Interaction with the LBA control 422 may causes a display to be presented to enable specification of a LBA. A portion of the seed data may be identified based on the LBA specified by the LBA control 422. The GI 400 may include one or more interactive elements, e.g., the load criteria controls 410, which enable further specification for identifying a particular portion of seed data for editing.

Interaction with a fetch data control 412 may cause the seed data to be loaded from a memory storage location (e.g., a first memory storage location) based on the partition control 420. The seed data may be retrieved based on criteria determined from interaction with one or more interactive elements in the GI 400. The seed data, after being accessed, may be displayed in the GI 400 within a seed data display area 456. The seed data displayed in the seed data display area 456 may include one or more records of seed data extracted from a database. The data may be displayed in one or more categories (e.g., a level, a group, or a description) based on criteria specified by interaction with interactive elements of the GI 400. The seed data display area 456 may include a description of the seed data records obtained from a data source.

Interaction with the GI 400 may cause information based on interaction with the GI 400 to be displayed in a log display area 414. For example, the log display area 414 may display information indicating records extracted from a database from which the seed data is accessed.

In a particular embodiment, the seed data display area 456 may include one or more interactive elements corresponding to a portion of the seed data displayed in the seed data display area 456. For example, a portion the seed data (e.g., a row or entry in of seed data) displayed in the seed data display area 456 may be associated with a functions control 416. Interaction with the functions control 416 may cause a list of interactive elements 418 to be displayed in the GI 400. In the example illustrated in FIG. 4, the list of interactive elements 418 is displayed in the seed data display area 456 proximate to the portion of the seed data associated with the functions control 416. One or more of the list of interactive elements 418 may be an interactive element that is associated with a function that may be performed on the portion of the seed data. The particular functions may include deleting the portion of the seed data, updating the portion of the seed data, inserting new seed data (e.g., second seed data) in the portion of the seed data, exporting the portion of the seed data, cleaning the portion of the seed data, or loading the portion of the seed data from a different source. Interaction with one of the list of interactive elements 418 may cause input data (e.g., second input data) to be received by a server (e.g., a server computer 320). The second input data may indicate the particular function to perform on the portion of the seed data.

In an illustrative example, interaction with (e.g., a selection) an interactive element (e.g., interactive element labeled "Delete Selected Single Row") of the list of interactive elements 418 may cause the portion of the seed data (e.g., a row of seed data) associated with the functions control 416 to be modified, such as being deleted. The portion of the seed data that is modified may be located at a memory storage location for the modified portion that is different from a beginning of the entire the seed data accessed from the first memory storage location. Deleting the portion of the seed data based on selection of the interactive element in the list of interactive elements 418 may cause data to be modified at the second memory storage location associated with the portion being modified is located. In particular embodiments, deleting a portion of the seed data selected associated with the functions control 416 may cause additional seed data associated with the selected seed data to be deleted. For example, selecting the functions control 416 for a row of the seed data may cause children associated with the row of seed data to be deleted. In some embodiments, a function associated with an interactive element of the list of interactive elements 418 is an export function that enables the portion of the seed data selected for the functions control 416 to be stored in another data source, such as a data file (e.g., an MS Excel® formatted file).

Thus, the edit function provided in the GI 400 reduces effort to manage seed data by permitting a user to modify the seed data when it is viewed. The ability to export seed data at a time when it is viewed enables a user to save important or noteworthy seed data that may otherwise be forgotten. In data management systems having many data sources, the GI 400 provides a way for a user to view associated relationships of seed data in a single view and accordingly modify the seed data based on the relationships.

2. Check Function

Figure 5:
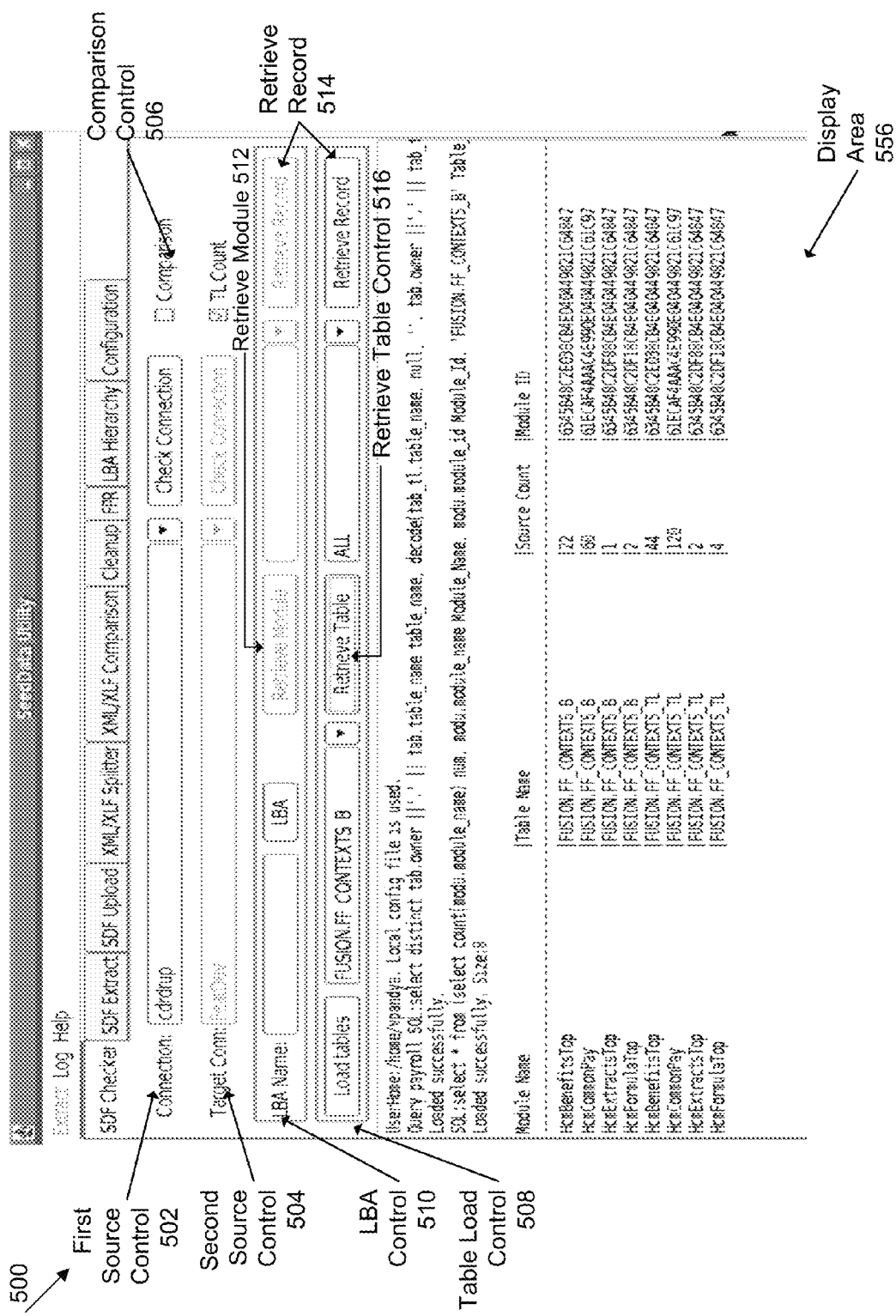
FIG. 5 shows a diagram illustrating an embodiment of a graphical interface presented by a seed data management system.

FIG. 5 is a diagram illustrating an embodiment of a GI 500 presented by a seed data management system. The GI 500 includes features and elements of a check function (e.g., an "SDF Checker" function as illustrated in FIG. 5) provided by a seed data management system (e.g., the seed data management system 300 of FIG. 3). The check function enables a user of the GI 500 to check and/or verify seed data. For example, a user may use the check function to verify that a shipped version of seed data matches a delivered version of seed data. As such, the GI 500 may enable a user to specify a first data source and a second data source for checking, or comparing the seed data accessible at the first data source. In another example, an administrator of the middleware computing system may desire to verify a particular portion of seed data to make sure an update or patch was applied. The GI 500 enables a user to specify portions of seed data to be accessed and displayed in the GI 500, where the specified portions presented in the display can be verified. The specific portions can be identified by a variety of interactive elements corresponding to categories including LBAs, tables, modules, and/or records in the seed data.

In a particular embodiment of the check function, the GI 500 includes a plurality of interactive elements to enable a check to be performed on seed data. In particular embodiments, the input data 352 or the input data 354 of FIG. 3 may include data specified by one or more of the plurality of interactive elements in the GI 500. The GI 500 may include interactive elements including a first source control 502, a second source control 504, and a comparison control 506. The controls 502-506 may be used to perform a comparison of a primary data source having seed data (e.g. first seed data) to a secondary data source having seed data (e.g., second seed data). The first seed data may be located at a memory storage location (e.g., a first memory storage location) in a first data source (specified by the first data source control 502) and the second seed data may be located at a memory storage location (e.g., a second memory storage location) in a second data source (specified by the second data source control 504). The second data source may be distinct from the first data source. A comparison of the first data source to the second data source may be initiated via the comparison control 506.

In a particular embodiment, a comparison of the first data source to the second data source may include comparing the first seed data to the second seed data to determine whether they are equal (e.g., identical) to each other. In another example, each entry (e.g., database row) in the first data source is compared to each entry in a second data source to determine whether the entries match or satisfy criteria for comparison. Such a comparison may be useful for verifying integrity of the seed data for changes (e.g., corruption or modification), or for verification of the seed data after installation, shipment, implementation, or other type of application of a product that uses the seed data. The comparison may be useful for scenarios such as installation of a system to verify that seed data used to for operating an application matches seed data shipped with the product. Although not described, the comparison may be used for other purposes (e.g., testing an environment) where seed data may be checked. Additionally, comparing seed data from different sources include enables a user (e.g., an administrator of a data management system) to reduce time for comparing seed data from different, physically separated data sources. The different data sources may be physically separated (e.g., networked data sources) or may be associated with different computing systems where manual access may consume additional time and resources. Thus, a user may avoid having to migrate data and perform additional steps before a comparison can be performed.

In particular embodiments, the first seed data, the second seed data, or both, may be stored in one of a plurality of formats including a database format, an XML file format, a comma-separate values (CSV) file format, a flat data file format, an Microsoft Excel® format, or another type of file format used to stored seed data. In some embodiments, the first seed data and the second seed data may be stored in different data formats. For example, the first seed data may be stored in an XML file format and the second seed data may be stored in an MS Excel® file format.

In a particular embodiment, the first source control 502 may be used to indicate an identifier (e.g., an application name or a name of a data source), which may be used to determine a first data source of first seed data (e.g., the memory 332, the database 372 of FIG. 3, or the database 382). An identifier specified in the first source control 502 may identify an application which is associated with the first data source. Further, the source connection control 502 may include a control to enable verification of a connection to the first data source from where seed data (e.g., first seed data) may be loaded. Similar to the first source control 502, the second source control 504 may be used to indicate an identifier (e.g., an application name or a name of a data source), which may indicate a second data source of second seed data (e.g., the memory 332, the database 372 of FIG. 3, or the database 382). An identifier specified in the second source control 504 may identify an application which is associated with the second data source. Further, the second source control 504 may include a control to enable verification of a connection to the second data source from where seed data (e.g., second seed data) may be loaded. Interaction with the comparison control 506 may cause the first seed data to be compared to the second seed data.

In particular embodiments, the GI 500 may be used to perform a check of seed data located at a single data source by viewing contents of specific portions of the seed data. Specifically, the GI may enable its users to check seed data from a particular data source (e.g., the first data source) identified based on the identifier provided via the first source control 502. The seed data chosen for verification may be displayed in the display area 556. The display area 556 may be included or may be implemented in the display area 356 of FIG. 3. The display area 556 may serve as a log display area that displays information about a comparison of seed data using the GI 500.

In particular embodiments, the GI 500 may include interactive elements including at least one of table load (TL) control 508, a LBA control 510, a retrieve module control 512, a retrieve record control 514, and a retrieve table control 516. These interactive elements enable identification of a portion of seed data accessible from the first source specified by the first source control 502 to be displayed in the display area 556. By displaying all or a portion of the seed data, a user may be able to check the data available in the first source to determine whether particular portions are accurately represented. The LBA control 510 enables a user to specify seed data associated with a particular LBA. The table load control 508 enables specification of a table that identifies a particular portion of seed data. The retrieve module control 512 enables a user to specify a specific application module that uses seed data. Interaction with the retrieve table control 516 or the retrieve module control 512 may cause information about the table or module specified by the table load control 508 and the retrieve module 512, respectively, to be displayed in the display area 556. When the table load control 508 and/or the retrieve module control 512 have been interacted with, the check (or comparison) function may be performed based on specific seed data identified in the first source based on the table and/or module specified. In a particular embodiment, the GI 500 may include the retrieve record control associated with either or both of the retrieve table and retrieve module functions. Interaction with either of the retrieve record controls 514 may cause the display area 556 to display data from the first data source associated with records corresponding to a particular module and/or table specified according to the retrieve module control 512 and table load control 512, respectively. Displaying records stored in the information identifying LBAs, modules, and/or tables may assist a user in verification of a structure of seed data in a data source. Additionally, or in the alternative, displaying such records may enable a user to determine a structure of the seed data for subsequent access via the GI's described herein.

3. Extract Function

Figure 6:
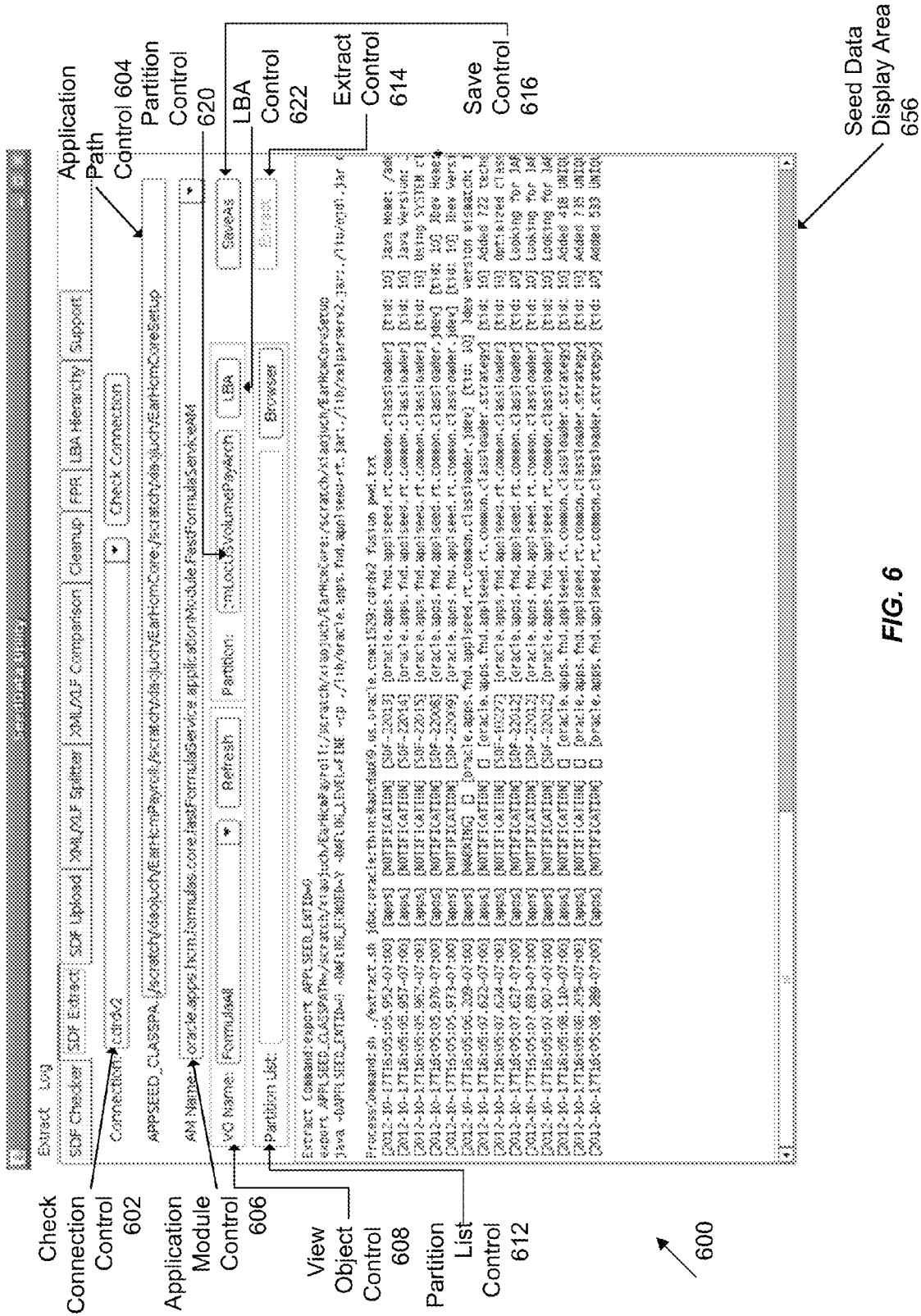
FIG. 6 shows a diagram illustrating an embodiment of a graphical interface presented by a seed data management system.

FIG. 6 is a diagram illustrating an embodiment of a GI 600 presented by a seed data management system. The GI 600 includes features and elements of an extract function (e.g., an "SDF Extract" function as illustrated in FIG. 6) provided by seed data management system (e.g., the seed data management system 300 of FIG. 3). The extract function enables a user of the GI 600 to extract a portion of seed data from seed data stored at a data source. Extracting a portion of seed data from a data source can be saved for verification after performing an operation on the portion of seed data before it has been extracted. The extracted seed data can be compared against other seed data (e.g., shipped seed data) to verify whether that the seed data has been implemented or applied via a patch.

In particular embodiments of the extract function, the GI 600 includes a seed data display area 656 to display seed data extracted from a data source. The seed data display area 656 may present information indicating commands, instructions, or operations performed to access seed data, extracted seed data, or other information associated with extracting seed data. The GI 600 may include a plurality of interactive elements to extract seed data from a data source. In particular embodiments, the input data 352 or the input data 354 of FIG. 3 may include data specified by one or more of the plurality of interactive elements in the GI 600. In particular embodiments, GI 600 may include interactive elements including a check connection control 602, application path control 604, and application module control 606. The controls 602, 604, and 606 may be used to specify information indicating an application that uses particular seed data. The controls 602, 604, 606 may have functions and features as described with respect to the controls 402, 404, and 406, respectively. The controls 602-606 enables a user of the GI 600 to specify a data source for extracting seed data identified associated with a source identified based on an application.

The GI 600 may include interactive elements to further specify a particular group of seed data at the data source and criteria or categories that identify particular seed data within the particular category. The GI 600 may include a VO control 608 for specifying a database view object to further identify a particular portion of the seed data extract. The database view object may include one or more database query statements that specify database queries for identifying a particular portion of the seed data. The VO control 608 may include or implement features and elements of the VO control 408. The GI 600 may include a partition control 620 to further identify seed data for extraction based on a partition of the data source. The partition control 620 may include or implement functions and elements of the partition control 420 of FIG. 4. The GI 600 may enable further specification of a partition based on interaction with a partition list control 612 that provides a list of available partitions. To further refine the portion of data for extract, the GI 600 may include a LBA control 622 to specify an LBA category for identifying a portion of seed data in the data source. Using the LBA control 622, seed data may be specified based on association with the LBA identified indicated with the LBA control 622. The LBA control 622 may include or implement functions and elements of the LBA control 422 of FIG. 4.

Interacting with the extract control 614 or a save control 616 may initiate extraction of seed data. The extracted portion of the seed data may be stored in a data file located at a memory storage device, such as the memory 322 of FIG. 3, the memory storage device 376, or the memory storage device 380. For example, the extracted seed data (e.g., the seed data 374 or the seed data 384) may be stored as database entries in the database 372 or the database 382. In another example, the extracted see data may be stored in the file system 326 of memory 322 as a data file (e.g., an XML file). In particular embodiments, the extracted seed data may be accessed via a particular display ("Extract View") presented in the GI 600 that displays saved extracts of seed data that were extracted based on interaction with the save control 616.

Providing a mechanism to enable a user to extract seed data from a data source may reduce effort for a user to locate or check seed data from across several data sources. Similar to advantages of the check function, a GI for extracting seed data enables a user (e.g., an administrator of a data management system) to quickly view seed data from a particular source without having to perform additional steps to access the data source and then extract the data. Further, extraction can be useful for verifying whether a particular portion of seed data has been updated or modified.

4. Upload Function

Figure 7:
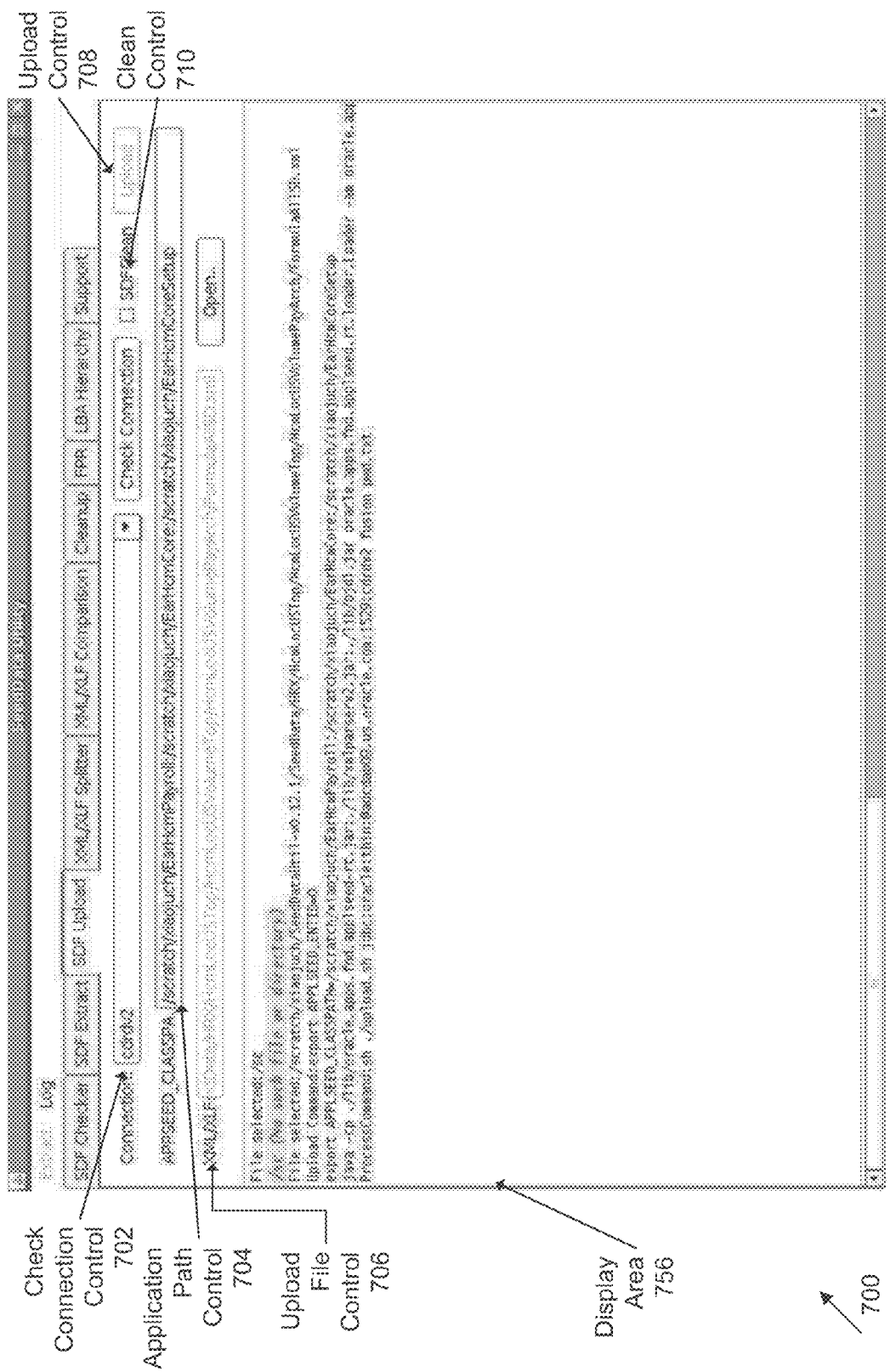
FIG. 7 shows a diagram illustrating an embodiment of a graphical interface presented by a seed data management system.

FIG. 7 is a diagram illustrating an embodiment of a GI 700 presented by a seed data management system. The GI 700 includes features and elements of an upload function (e.g., an "SDF Upload" function as illustrated in FIG. 7) of a seed data management system (e.g., the seed data management system 300 of FIG. 3). The upload function provides a mechanism to enables a user to store seed data a particular data source. For example, a user that desires to upload additional or missing seed data may update seed data accessed from a data source by specifying a data source containing updated seed data and a data source where seed data to be uploaded (e.g., upload seed data) is to be stored. Using the upload function, a user can upload seed data in one format (e.g., a XML format) to a data source storing seed data in a different or similar format. Further, storing seed data from one source to another enables a user to move seed data from a local source (e.g., the memory 322) to a data source that may be located elsewhere, such as in a remote memory storage device (e.g., the memory storage device 384).

In the example illustrated in FIG. 7, the GI 700 enables a user to store, or upload, seed data from a data file (e.g., an XML file) to a data source of seed data identified based on a particular application. The GI 700 includes a plurality of interactive elements including a check connection control 702 and an application path control 704. The control 702, 704 may be used to specify a destination data source of seed data where data is to be uploaded. The destination data source may be identified based on an application associated with seed data. The check connection control 702 and the application path control 704 may include features and elements as described with respect to controls 402 and 404, respectively.

In the GI 700, an upload file control 706 enables a user to specify an upload data source containing seed data to be uploaded (e.g., upload seed data) to the destination data source. The upload data source containing the upload seed data may be associated with a memory storage location. For example, the server computer 320 containing the uploaded seed data may be associated with a memory storage location in the memory 322. The memory storage location may be distinct from a memory storage location associated with the destination data source. In a particular embodiment, the upload seed data may be stored in a particular file format (e.g., an XML file format) in a file. Interaction with an upload control 708 in the GI 700 may cause upload seed data to be stored at the destination data source.

The GI 700 further includes a display area 756 that may be included or may be implemented in the display area 356 of FIG. 3. The seed data display area 756 may provide resulting output indicating a result of operations (e.g., an upload) performed using the GI 700. The output may include specific details about the destination data source and/or the upload seed data. Additionally, the GI may include a clean control 710, which when interacted with (e.g., selected) causes the display area 756 to be deleted, or cleaned.

Thus, using a GI having interactive elements for uploading seed data from one data source to another data source, a user can efficiently migrate seed data between data sources. Such migration can be performed regardless of a file format representing the migrated seed data.

5. Split Function

Figure 8:
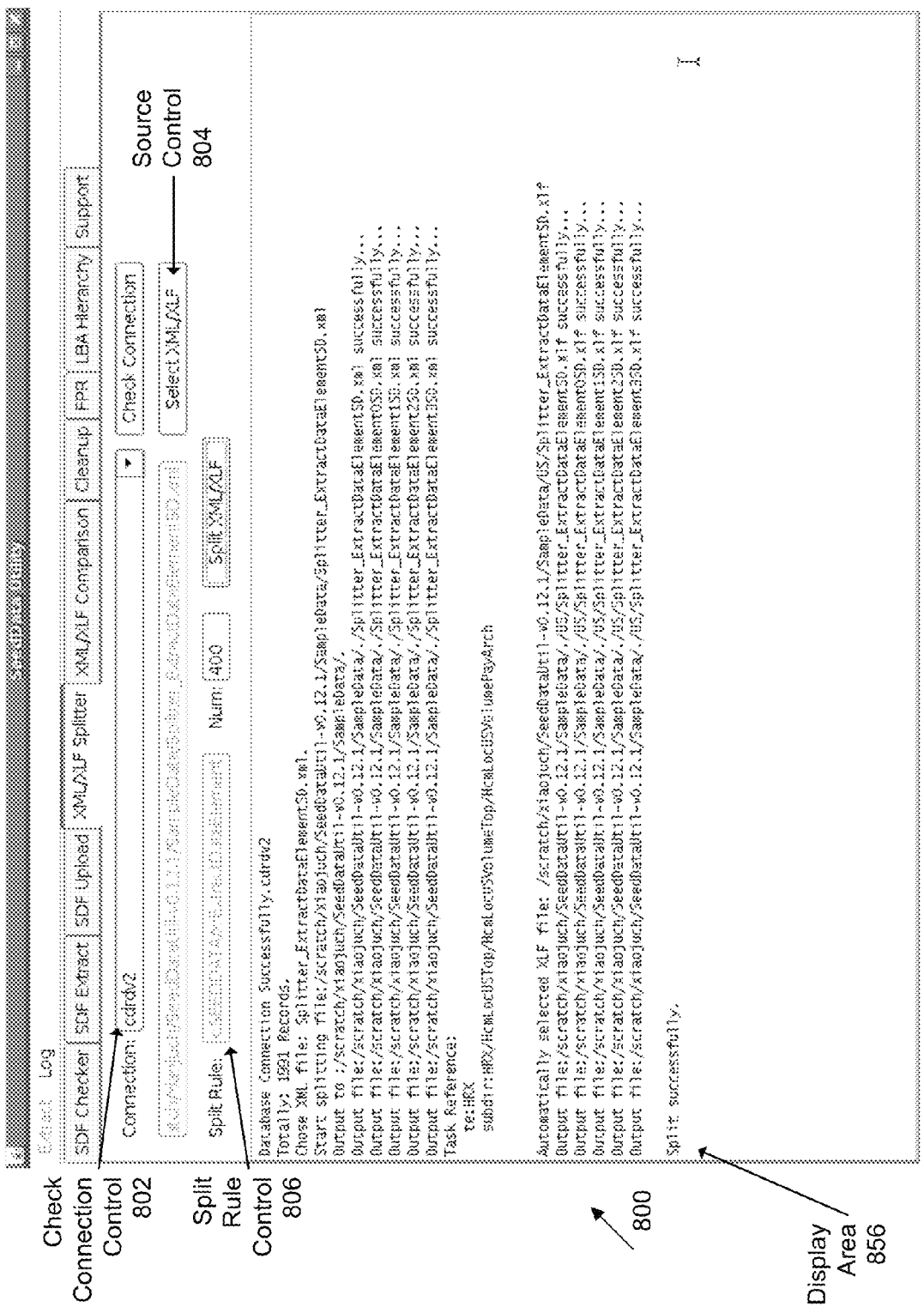
FIG. 8 shows a diagram illustrating an embodiment of a graphical interface presented by a seed data management system.

FIG. 8 is a diagram illustrating an embodiment of a GI 800 presented by a seed data management system. The GI 800 includes features and elements of a split function (e.g., an "XML/XLF Splitter" function as illustrated in FIG. 8) provided by a seed data management system (e.g., the seed data management system 300). The split function enables seed data in a source file (e.g., an XML file) to be split into multiple data files that include a portion of the seed data from the source file. While the embodiment illustrated in FIG. 8 illustrates the split function performed for an XML file, it may be appreciated that other types of files containing seed data may be split using the split function. The split function may enable a source file to be split based one or more criteria (e.g., rules). The criteria may include delimiters, such as characters, or other specific string of characters, which may identify seed data in the source file. The criteria may vary based on a format of the source file.

In the example illustrated in FIG. 8, the GI 800 enables a user to split seed data stored in a data file (e.g., an XML file) specified by a source control 804. In some embodiments, the GI 800 may include a check connection control 802 that identifies a database connection for the split function. The check connection control 802 may include features and elements of the check connection control 402 of FIG. 4. Interaction with the source control 804 enables a data source (e.g., a data file) containing seed data to be split. The data source may be associated with a memory storage location in a memory storage device (e.g., the memory 322). The source control 804 may provide a list of data files or sources of seed data available in the system. In particular embodiment, a split rule control 806 may enable a user to specify information (e.g., a name) identifying a split rule(s) for splitting the source file. The split rule(s) may be based on a format of the source, content of the source file, or both.

The GI 800 may present other information about the source file, such as a number of data records (e.g., entries) in the source file. A display area 856 may present information regarding the split function performed on the source specified by the source control 804. The information may indicate a number of records identified, a location of files split from the source file, and a location of the source file. The display 856 may be included or may be implemented in the display area 356 of FIG. 3. The resulting files produced by the split function may be stored in at a data source, such as a file system (e.g., the file system 326 in the memory 322). The data source may be distinct from a data source containing the data file with seed data before a split is performed.

A function for splitting seed data in a source file, such as an XML file, may be a valuable tool for separating seed data into specific categories of seed data, such as for specific applications. Large amounts of seed data may be more easily managed and accessed when seed data is split into categories.

6. Compare Function

Figure 9:
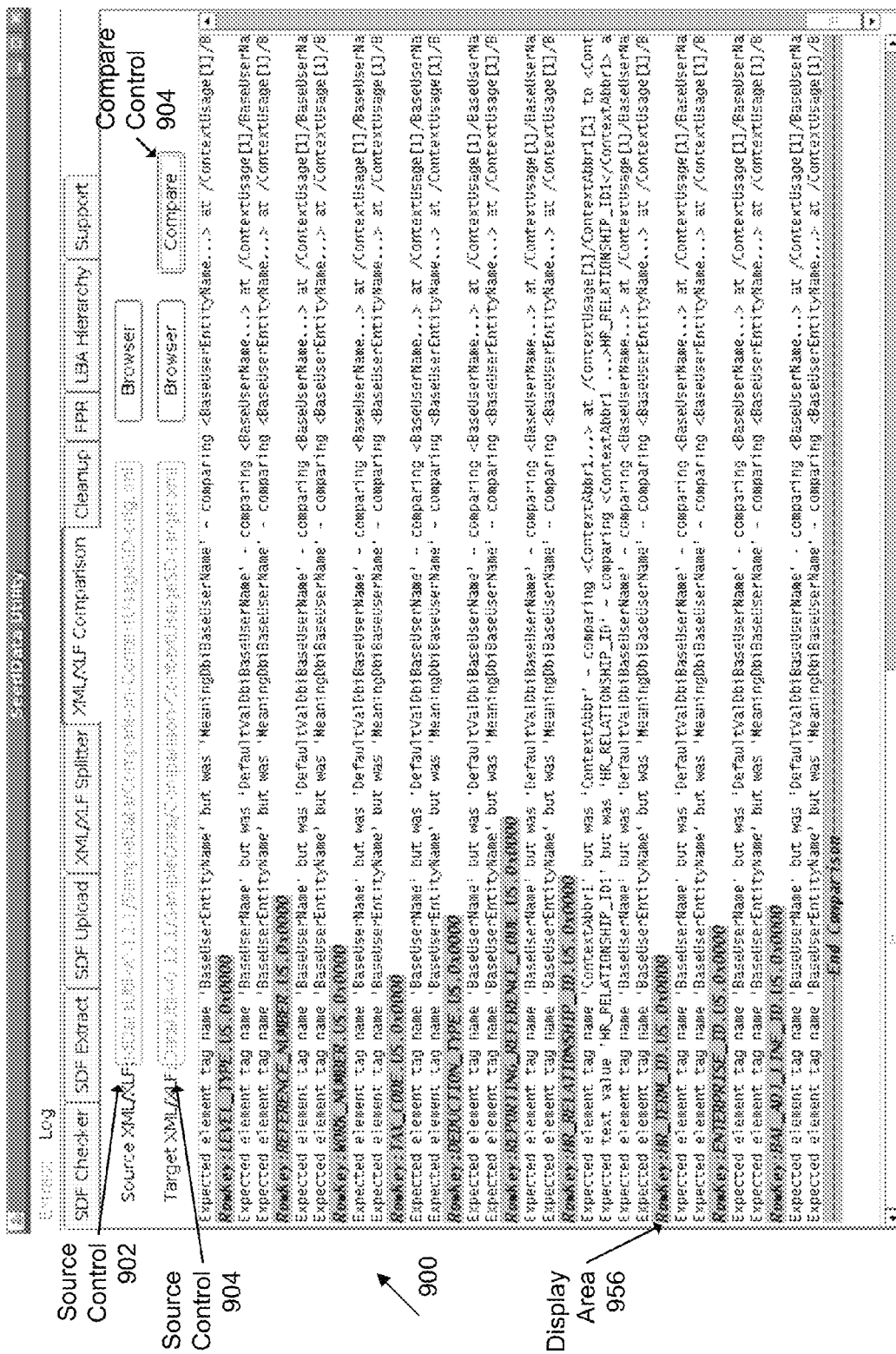
FIG. 9 shows a diagram illustrating an embodiment of a graphical interface presented by a seed data management system.

FIG. 9 is a diagram illustrating an embodiment of a GI 900 presented by a seed data management system. The GI 900 includes features and elements of a compare function (e.g., an "XML/XLF Comparison" function illustrated in FIG. 9) provided by f a seed data management system (e.g., the seed data management system 300 of FIG. 3). The compare function enables seed data (e.g., first seed data) in one source file (e.g., a first source file) to be compared with seed data (e.g., second seed data) in another source file (e.g., a second source file). The compare function enables two different sources of seed data to be compared based on one or more criteria (e.g., rules). The criteria may include one or more values associated with a particular attribute in seed data to determine whether particular seed data has changed. The comparison function enables one to determine whether seed data has changed. Such a function can be useful for determining whether a patch has been applied, determining whether a modification has been made to seed data, or for verifying seed data. While the embodiment illustrated in FIG. 9 depicts a comparison performed between two files having a particular file format (e.g., XML file format), it may be appreciate the comparison function is configured to perform a comparison of seed data located at two different sources. The comparison function can be performed for seed data identified based on a memory storage location instead of a data file. For example, seed data in a file (e.g., an XML file) can be compared to seed data in a database, or vice versa. In another example, seed data in the database 372 of a memory storage device 376 may be compared to seed data stored in another database 382 of a different memory storage device 380.

In the example illustrated in FIG. 9, the GI 900 includes a plurality of interactive elements to specify seed data for the compare function. The source control 902 may be interactive to enable a user to specify a data source of seed data (e.g., a first data source). A source control 904 may be an interactive element, when interacted with, enables a user to specify another data source of seed data (e.g. a second data source). Execution of a compare control 906 may initiate the compare function. In particular embodiments, the GI 900 may include a display area 956. The display area 956 may be included or may be implemented in the display area 356 of FIG. 3. The seed data display area 956 may display a result of the comparison function including information identifying a result of a comparison of fields or records that are compared for the compare function.

7. Clean Function

Figure 10:
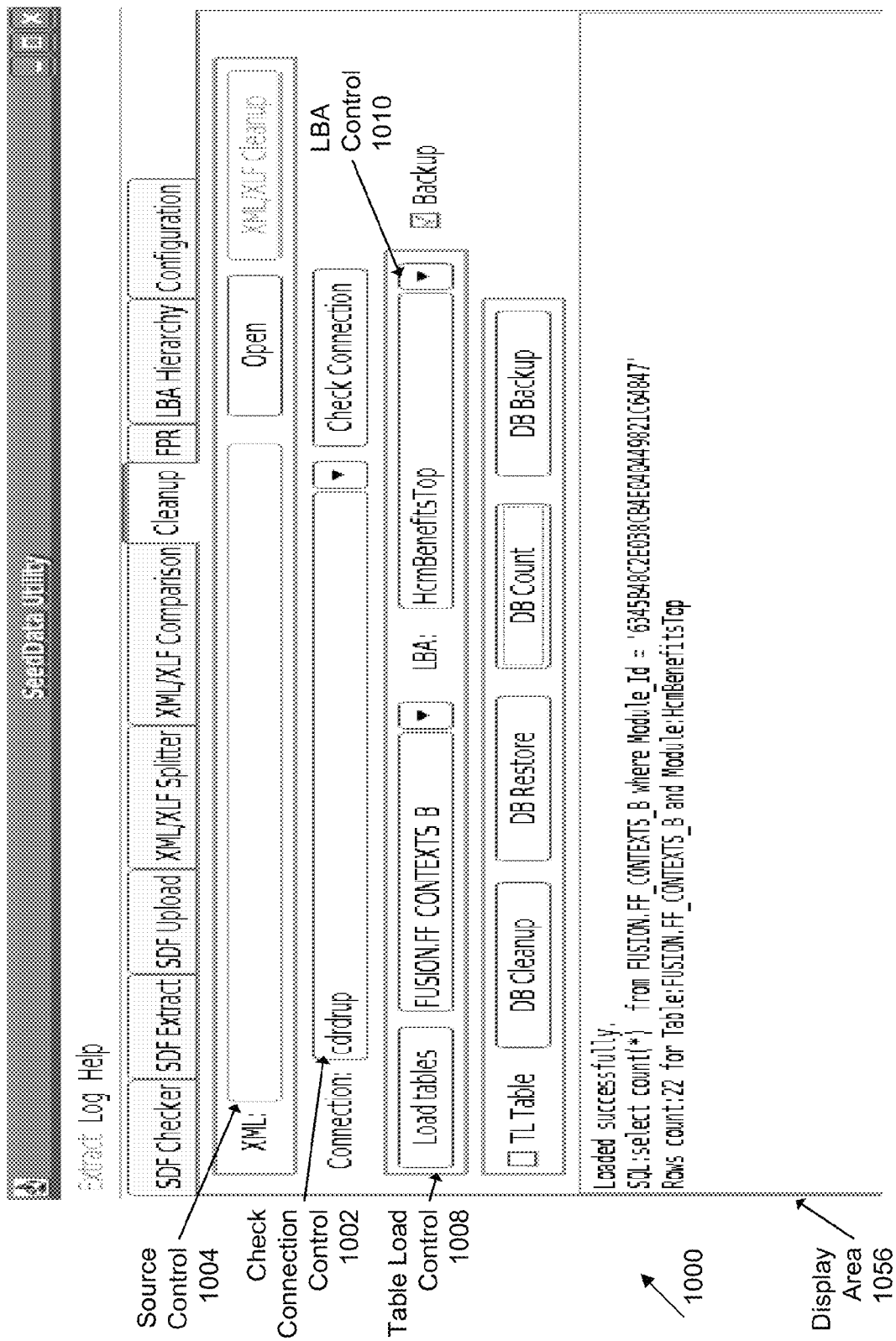
FIG. 10 shows a diagram illustrating an embodiment of a graphical interface presented by a seed data management system.

FIG. 10 is a diagram illustrating an embodiment of a GI 1000 presented by a seed data management system. The GI 1000 includes features and elements of a clean function (e.g., a "cleanup" function) provided by a seed data management system (e.g., the seed data management system 300 of FIG. 3). The clean function offers a different mechanism to modify a source of seed data. In some cases seed data may need to be cleaned up to remove duplicate or unnecessary seed data. Rather than manually locating a data source for seed data, the GI 1000 provides an improved system to identify a source of seed data and clean unwanted seed data. Specifically, the GI 1000 includes one or more interface elements for specifying input to identify seed data for cleaning. A source control 1004 enables specification of a data source (e.g., a data file) of seed data. A check connection control 1002 may enable a user to specify a connection to a database for performing clean function. The check connection control 1002 may include features and elements of the check connection control 402 of FIG. 4.

The GI 1000 may include a table load control 1008 to specify a particular table that is used to identify a particular portion of seed data. An LBA control 1010 may enable seed data to be further specified based on association with an LBA. Other interface elements in the GI 1000 may provide features for generating a copy (e.g., backup) of data cleaned via the clean function. The backup may be used in subsequent operations to restore data that was cleaned using the clean function. Options for the clean function may be provided via the configuration function described in further detail below with respect to FIG. 13.

8. Patch Request Function

Figure 11:
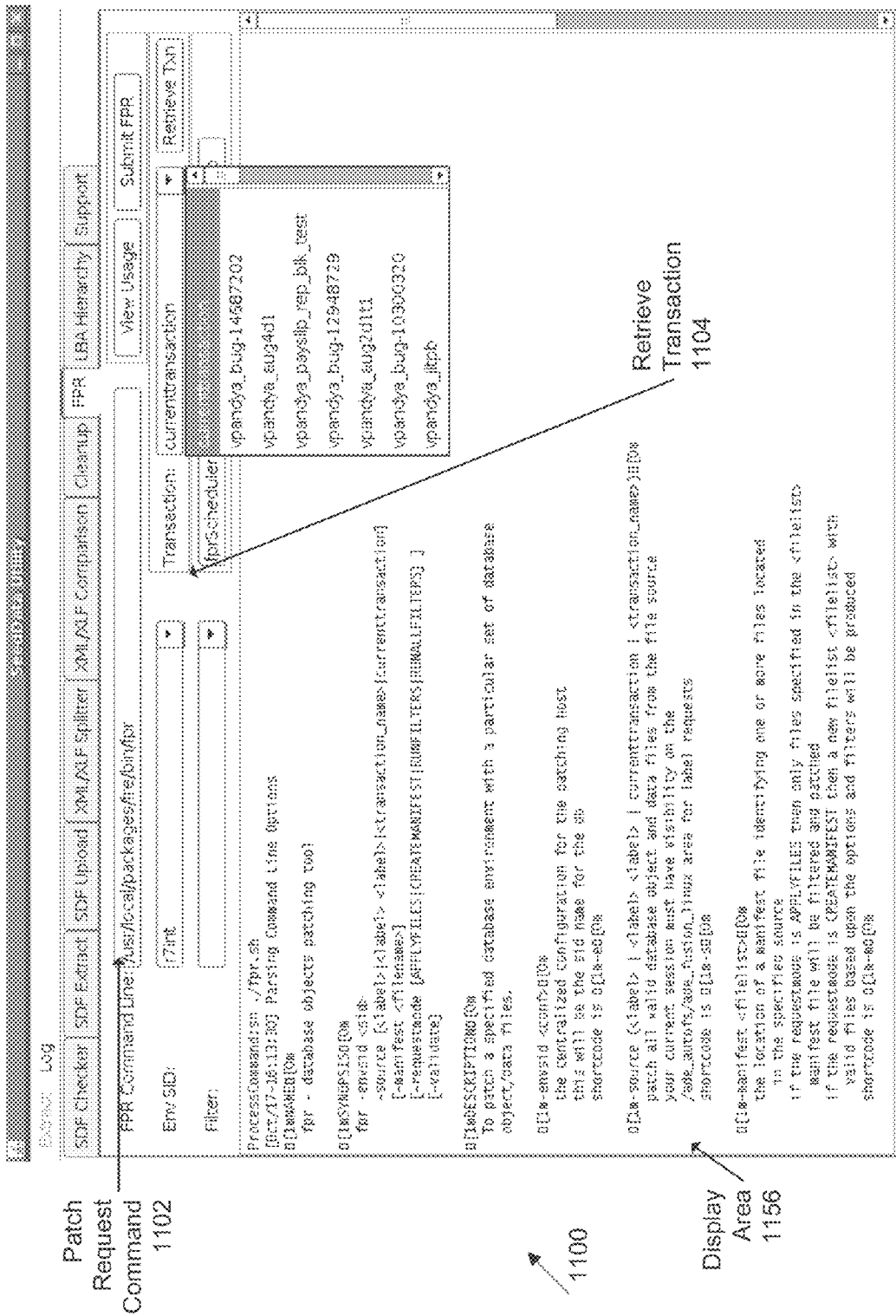
FIG. 11 shows a diagram illustrating an embodiment of a graphical interface presented by a seed data management system.

FIG. 11 is a diagram illustrating an embodiment of a GI 1100 presented by a seed data management system. The GI 1100 includes features and elements of a patch request function (e.g., an "FPR" function as illustrated in FIG. 11) of a seed data management system (e.g., the seed data management system 300 of FIG. 3). The patch request function enables a command to be issued to apply a patch (e.g., a fix or a change) to the seed data management system using a set of database files. The set of database files may include files with seed data. By executing a patch request command, multiple files including seed data may be applied and tested in a computing environment (e.g., the middleware computing system 305).

In the example illustrated in FIG. 10, the GI 1000 includes a plurality of interactive elements for specifying input to perform a patch request function (e.g., a "FPR" function). A patch request command control 1002 enables a user to specify a patch request command or a location (e.g., a file path) to a memory storage location where a patch request command is located. The patch request command enables execution of a program, such as a patch, that utilizes seed data. The seed data for the patch request function may be accessed from a plurality of data sources. For example, the patch request function may enable a plurality of seed data files (e.g., XML files) to be tested as a group for a particular application. The GI 1100 includes a retrieve control 1104 by which a user can select a predefined identifier associated with a group (e.g., a transaction group) that identifies a particular group of seed data. The GI 1100 may also include a display area 1156 that provides information related to execution of the patch request function. For example, the display area 1156 may indicate a command executed for the patch request function, a result of the patch request function, and/or seed data used to perform the patch request function.

Thus, a feature such as a patch request function enables a user to perform commands based on seed data located at multiple sources. Whereas, without the patch request function, a user may have to configure an environment or execute multiple commands to be able to perform a test that accesses seed data from multiple sources. In systems, where multiple sources may not be easily identifiable, a grouping feature to identify related seed data eliminates effort to target a command for specific seed data.

9. Hierarchy View

Figure 12:
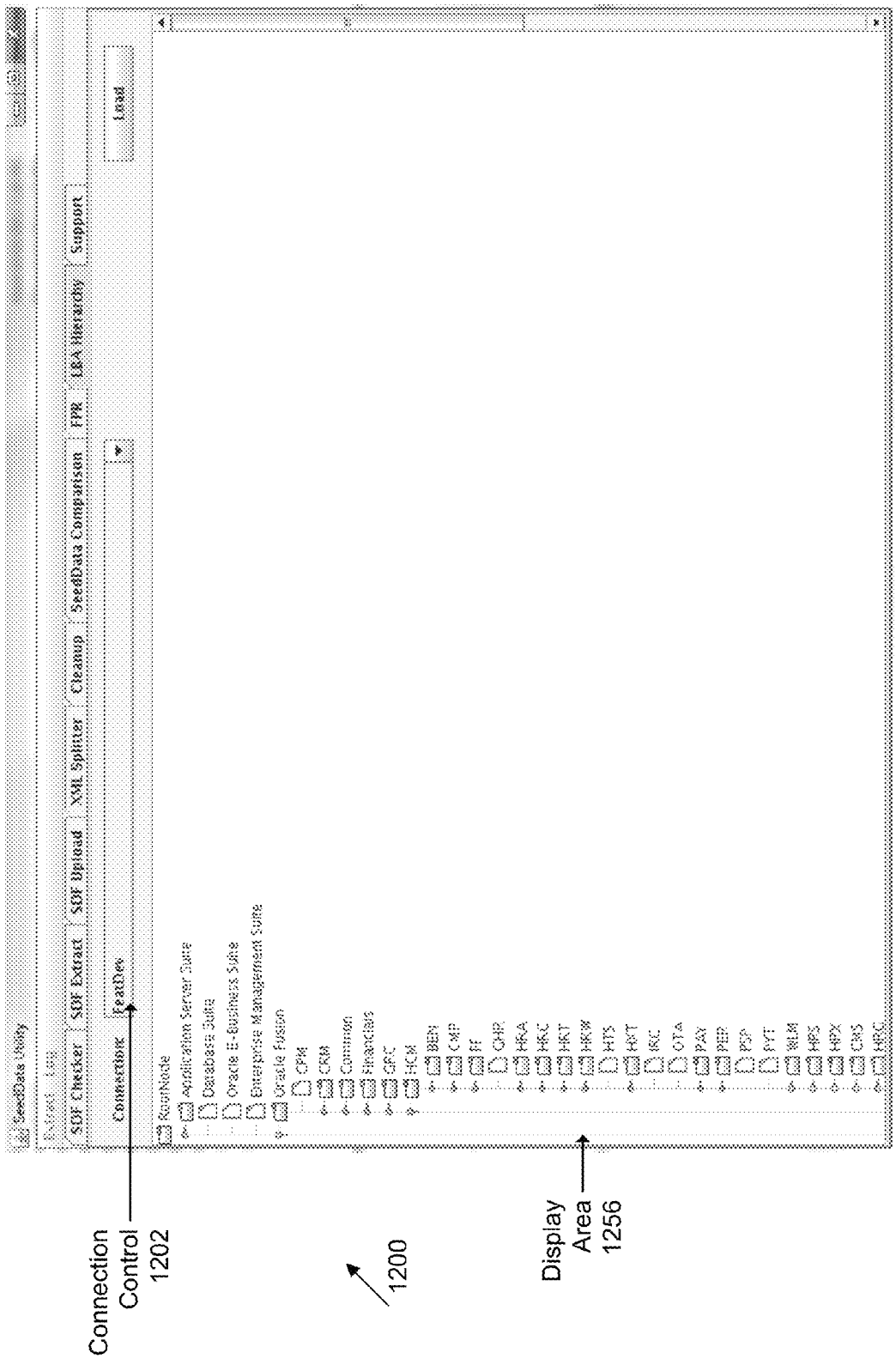
FIG. 12 shows a diagram illustrating an embodiment of a graphical interface presented by a seed data management system.

FIG. 12 is a diagram illustrating an embodiment of a GI 1200 presented by a seed data management system. The GI 1200 includes features and elements of a hierarchy view (e.g., a "LBA Hierarchy" view) provided by a seed data management system (e.g., the seed data management system 300 of FIG. 3). The GI 1200 may display information indicating one or more logical business areas (LBAs) associated with an application environment of the seed data management system. For example, the application environment may include one or more applications corresponding to applications modules 336 executing in the computing device 330. The LBA's may correspond to categories or groups corresponding to applications in the application environment. The LBA's may be used to specify particular seed data associated with an application belonging to the LBA. In particular embodiments, the GI 1200 may include a connection control 1202 to specify an identifier indicating an application environment. A display area 1256 displays one or more LBA's of the application environment. The display area 1256 may be included or may be implemented in the seed data display area 356. In a seed data management system with many applications using seed data, a view of LBA hierarchy may assist a user of the system in identifying seed data associated with a particular category or group in the application environment. Thus, the LBA hierarchy may reduce time spent in locating, from many data sources, seed data associated with particular applications.

10. Configuration Function

Figure 13:
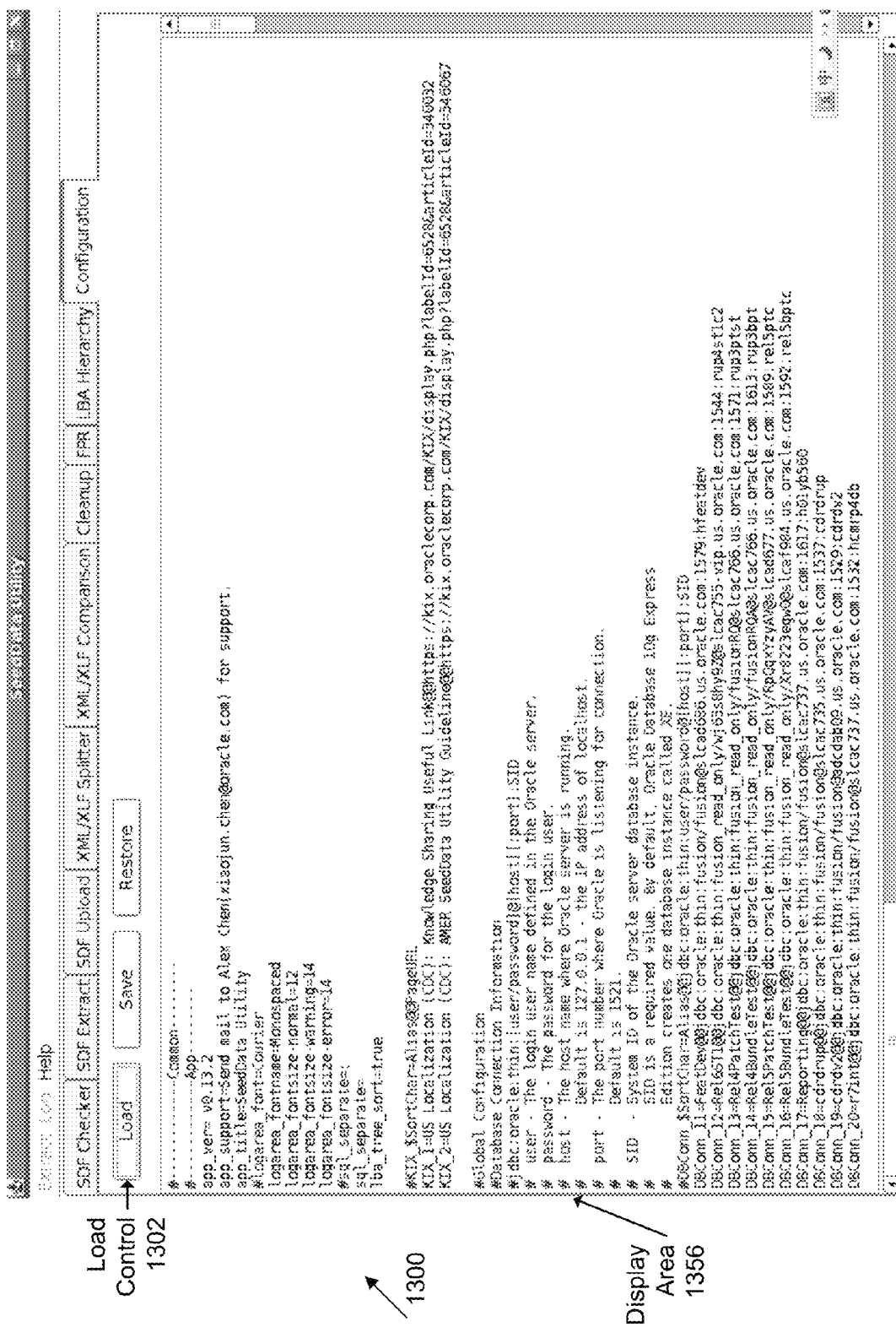
FIG. 13 shows a diagram illustrating an embodiment of a graphical interface presented by a seed data management system.

FIG. 13 is a diagram illustrating an embodiment of a GI 1300 presented by a seed data management system. The GI 1300 includes features and elements of a configuration function provided by a seed data management system (e.g., the seed data management system 300 of FIG. 3). The GI 1300 enables a user to specify configuration information such as commands, instructions, options, parameters, information for configuring a seed data management function via a GI (e.g., a GI illustrated in one or more of FIGS. 3-12), or parameters for configuring a seed data management system. The GI 1300 may include a load control 1302 that provides interactive elements and/or a display to enable a user to provide a data file or specify a source of the configuration information. The GI 1300 may include one or more interactive elements to active or apply configuration information to the seed data management system or to restore previous or default configuration information. A display area 1356 may be presented in the GI 1300 to present particular configuration information, such as configuration information that is loaded via the load control 1302. The configuration information may include access information (e.g., a username and a password), connection information (e.g., a port, a system identification of a database), display preferences (e.g., a font style or a font color), seed data specifications (e.g., seed data delimiters or sort preference for display options for a seed data input parameter), and other information for specifying seed data for management via the seed data management system.

Figure 14:
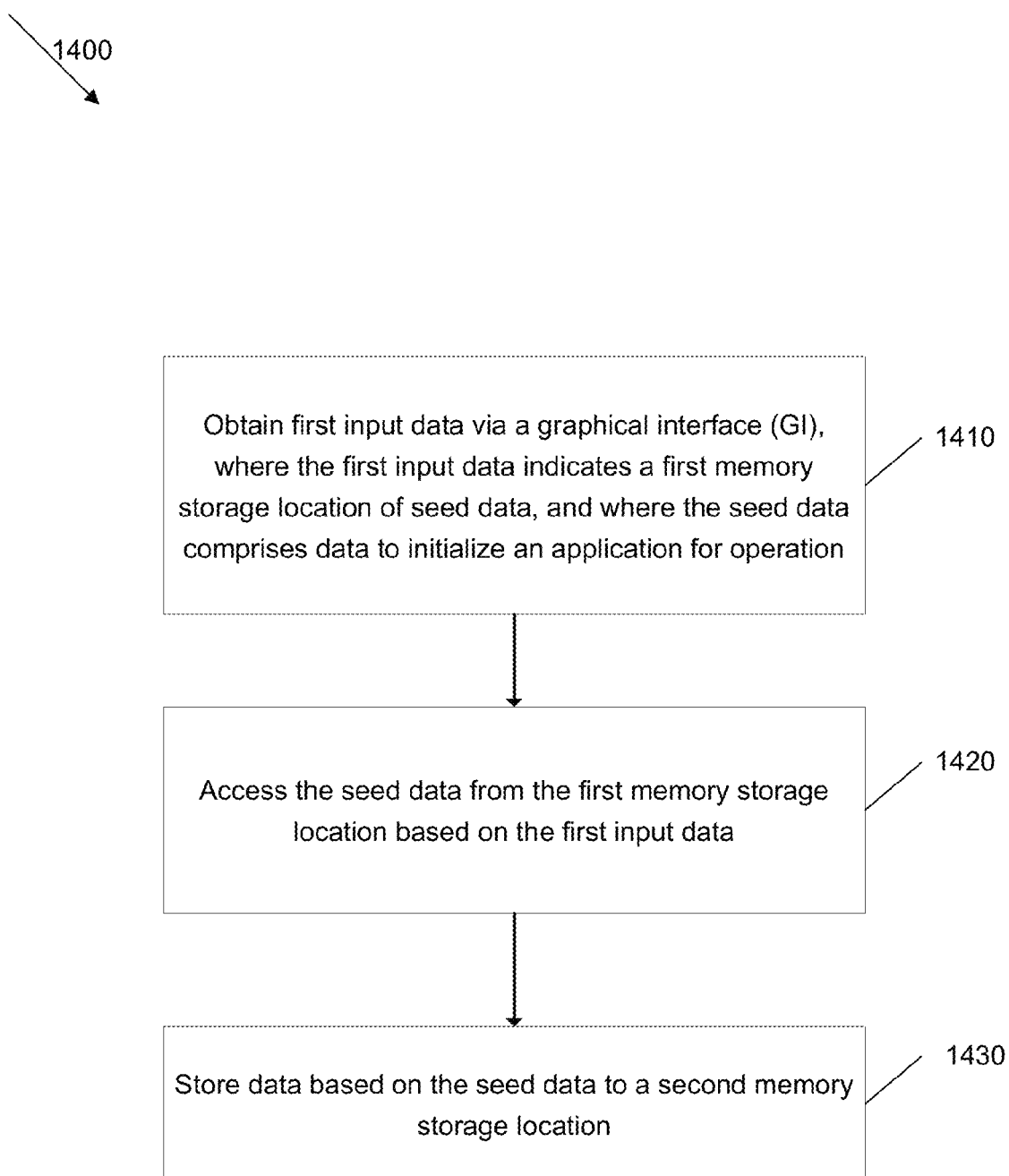
FIG. 14 illustrates a flowchart of an embodiment of a process performed by a seed data management system.

FIG. 14 illustrates a flowchart of an embodiment of a process 1400 performed by a seed data management system. For example, the process 1400 may be performed by the seed data management system 300 of FIG. 3. In this example, seed data may be managed by performing the process 1400 that includes the steps 1410, 1420, and 1430.

The process 1400 begins at step 1410 which includes obtaining first input data via a graphical interface (GI). The first input data indicates a first memory storage location of seed data. The seed data comprises data to initialize an application for operation. To illustrate, the server computer 320 of FIG. 3, may obtain the input data 352 (e.g., first input data) via the GI 350 displayed at the display device 340. The input data 352 may indicate a memory storage location (e.g., a first memory storage location) of seed data 374. The first memory storage location may be in a memory storage device such as the memory storage device 376, the memory storage device 380, or the memory 322. The first memory storage location may be where all or a portion of the seed data is stored. The seed data 374 may initialize an application for operation.

At block 1420, the process 1400 includes accessing the seed data from the first memory storage location based on the first input data. Continuing with the example illustrated at 1410, the server computer 320 accesses the seed data 374 from the memory storage location (e.g., the first memory storage location in the memory storage device 376) based on the input data 352. On to block 1430, data is stored to a second memory storage location based on the seed data. For example, the server computer 320 stores data based on the seed data 374 to a memory storage location (e.g., a second memory storage location). The data may include a portion of the seed data 374 that may have been modified in the GI 350 displaying the seed data. The memory storage location may be in a memory storage device such as the memory storage device 376, the memory storage device 380, or the memory 322.

Figure 15:
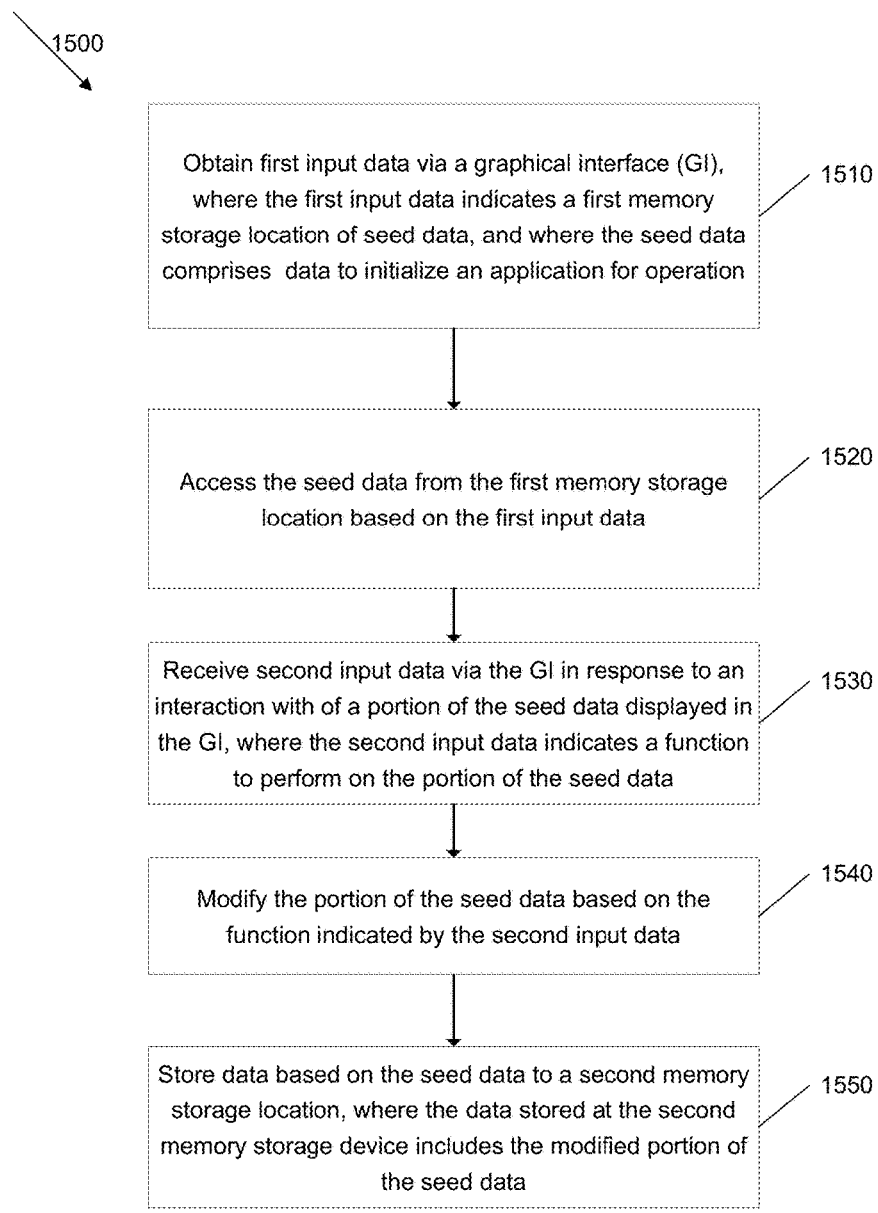
FIG. 15 illustrates a flowchart of an embodiment of a process performed by a seed data management system.

FIG. 15 illustrates a flowchart of an embodiment of a process 1500 performed by a seed data management system. For example, the process 1500 may be performed by the seed data management system 300 of FIG. 3.

At step 1510, a server computer (e.g., the server computer 320) obtains first input data (e.g., input data provided via one or more of the interactive elements 402-412, 420, 422) via a graphical interface (GI) (e.g., the GI 400). The first input data indicates a first memory storage location of seed data. The seed data comprises data to initialize an application for operation. At 1520, the process 1500 includes accessing the seed data from the first memory storage location based on the first input data.

After the seed data is accessed at 1520, the process 1500 continues to 1530 where the server computer receives second input data (e.g., input data provided via an interactive element of the list of interactive elements 418) via the GI in response to an interaction with of a portion of the seed data displayed in the GI. The second input data indicates a function (e.g., an edit function) to perform on the portion of the seed data. Continuing onto 1540, the portion of the seed data is modified (e.g., edited) based on the function indicated by the second input data. The portion of the seed data may be modified by at least one of inserting a second portion of the seed data in the portion of the seed data, changing the portion of the seed data to second seed data, or deleting the portion of the seed data stored.

At 1550, the server computer stores data based on the seed data to a second memory storage location. The data stored at the second memory storage device includes the modified (e.g., edited) portion of the seed data. For example, the modified portion of the seed data may be edited based on selection of a modify function (e.g., the edit function) via one of the list of interactive elements 418.

Figure 16:
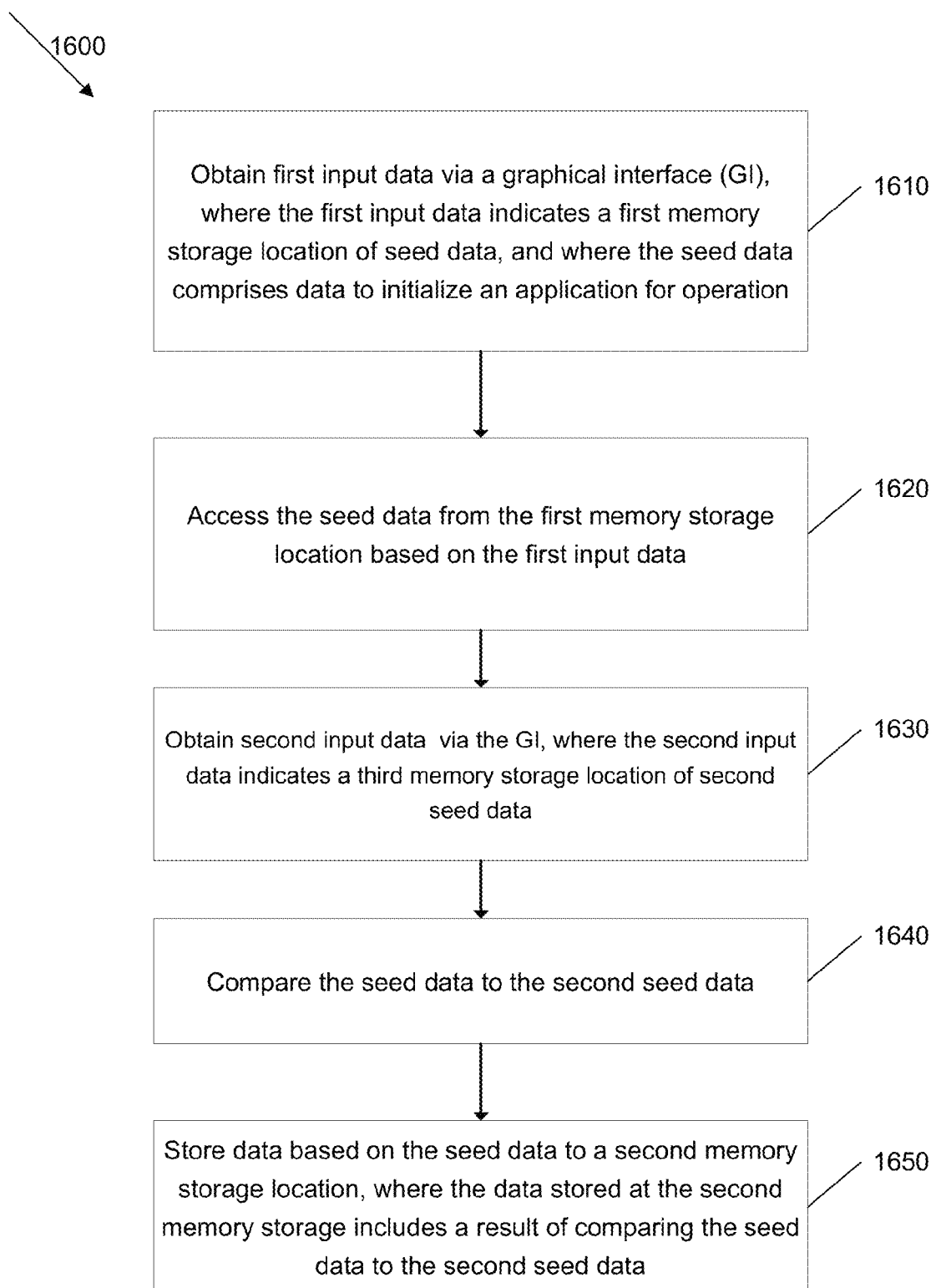
FIG. 16 illustrates a flowchart of an embodiment of a process performed by a seed data management system.

FIG. 16 illustrates a flowchart of an embodiment of a process 1600 performed by a seed data management system. For example, the process 1600 may be performed by the seed data management system 300 of FIG. 3.

At step 1610, a server computer (e.g., the server computer 320) obtains first input data (e.g., input data indicating a first data source provided via the source control 902) via a graphical interface (GI) (e.g., the GI 900). The first input data indicates a first memory storage location of seed data. The seed data comprises data to initialize an application for operation. At 1620, the process 1600 includes accessing the seed data from the first memory storage location (e.g., a location of the seed data stored in the first data source) based on the first input data.

The server computer, at 1630, obtains second input data (e.g., input data indicating a second data source provided via the source control 904) via the GI. The second input data indicates a third memory storage location of second seed data (e.g., a location of second seed data stored in the second data source). At 1640, the server computer compares the seed data to the second seed data. Then at 1650, data is stored to a second memory storage location based on the seed data. The data may include a result of comparing the seed data to the second seed data. The second memory storage location may be a location in a memory of the server computer.

In a particular embodiment, the first memory storage location may indicates a location of a first data file stored at the server computer. The seed data is stored in the first data file in a first extended markup language (XML) format. The third memory storage location may indicate a location of a second data file stored at the server computer. The second seed data is stored in the second data file in a second XML format.

Figure 17:
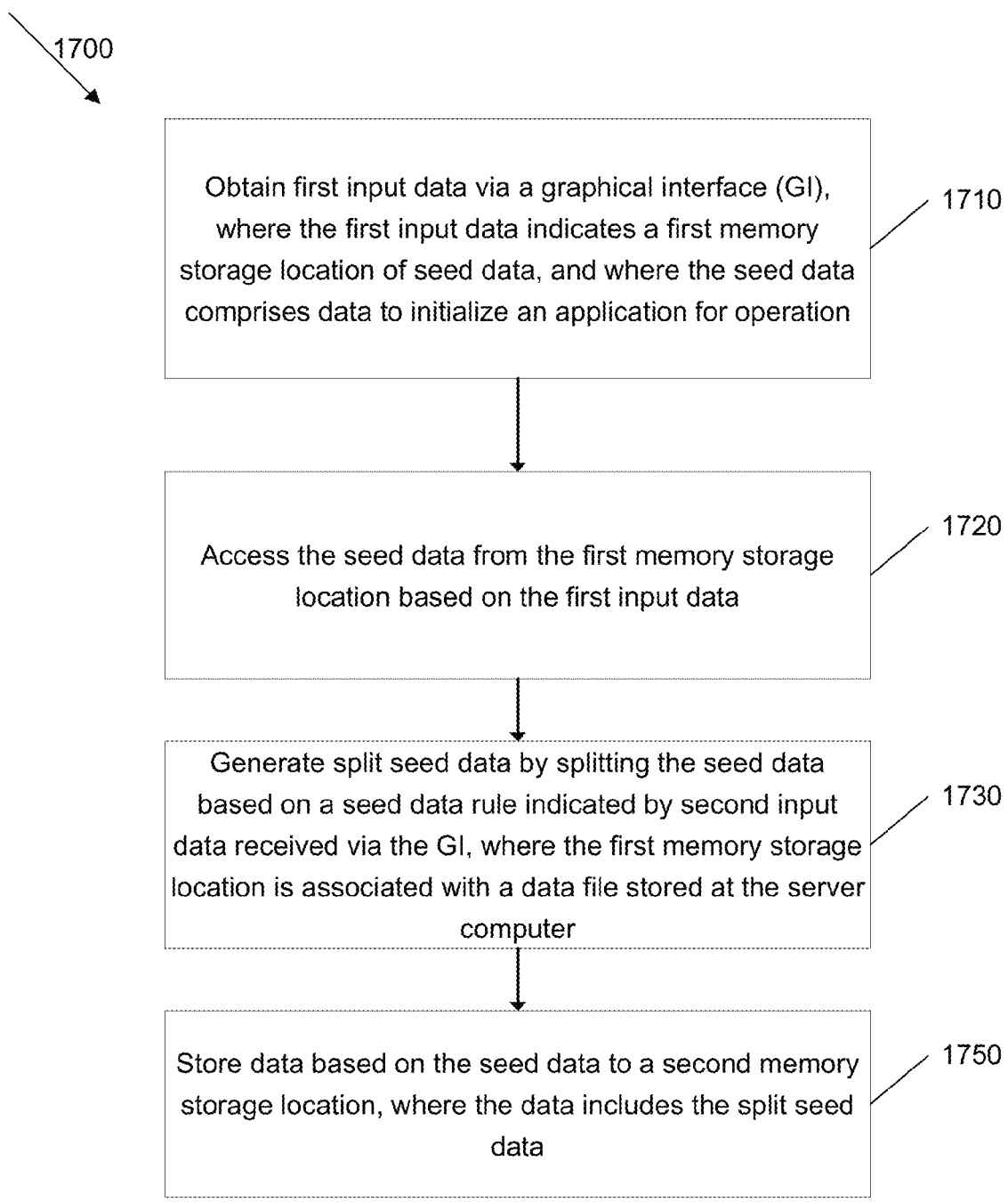
FIG. 17 illustrates a flowchart of an embodiment of a process performed by a seed data management system.

FIG. 17 illustrates a flowchart of an embodiment of a process 1700 performed by a seed data management system. For example, the process 1700 may be performed by the seed data management system 300 of FIG. 3.

At step 1710, a server computer (e.g., the server computer 320) obtains first input data (e.g., input data indicating a data source provided via the source control 804) via a graphical interface (GI) (e.g., the GI 800). The first input data indicates a first memory storage location of seed data. The seed data comprises data to initialize an application for operation. At 1720, the process 1700 includes accessing the seed data from the first memory storage location (e.g., a location of seed data stored in the data source) based on the first input data.

The server computer, at 1730, generates split seed data (e.g., a portion of the seed data split from the seed data) by splitting the seed data based on a seed data rule indicated by second input data (e.g., input data received via the split rule control 806) received via the GI. The first memory storage location is associated with a data file (e.g., a first XML file) stored at the server computer. At 1740, data (e.g., the split seed data) is stored to a second memory storage location. The data stored at the second memory location includes the split seed data. For example, the split seed data may be stored to another data file (e.g., a second XML file) located at the second memory storage location.

Figure 18:
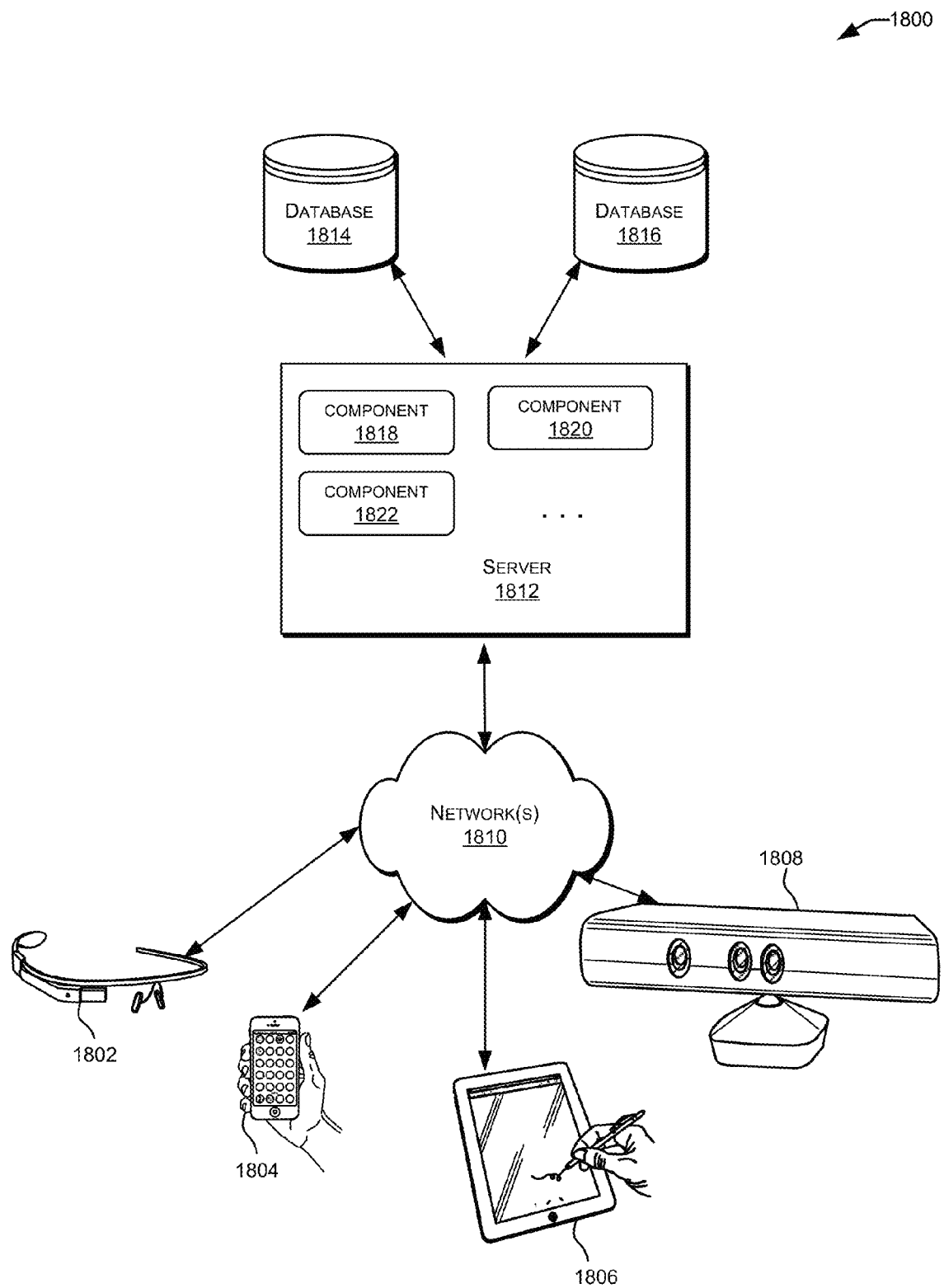
FIG. 18 depicts a simplified diagram of a distributed system for implementing one of the embodiments.

FIG. 18 depicts a simplified diagram of a distributed system 1800 for implementing one of the embodiments. In the illustrated embodiment, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various embodiments, server 1812 may be adapted to run one or more services or software applications provided by one or more of the components of the system. In some embodiments, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in the figure, the software components 1818, 1820 and 1822 of system 1800 are shown as being implemented on server 1812. In other embodiments, one or more of the components of system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The embodiment shown in the figure is thus one example of a distributed system for implementing an embodiment system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1812 may be adapted to run one or more services or software applications described in the foregoing disclosure. For example, server 1812 may correspond to a server for performing processing described above according to an embodiment of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of embodiments, databases 1814 and 1816 may reside in a storage-area network (SAN). Similarly, any necessary files for performing the functions attributed to server 1812 may be stored locally on server 1812 and/or remotely, as appropriate. In one set of embodiments, databases 1814 and 1816 may include relational databases, such as databases provided by Oracle, that are adapted to store, update, and retrieve data in response to SQL-formatted commands.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
obtaining, by a computer system, first input data of a first interaction with a graphical interface, wherein the first input data identifies a first memory storage location of first seed data, and wherein seed data includes data used in execution of an application;
displaying, in the graphical interface, the first seed data accessed from the first memory storage location identified by the first input data;
obtaining, by the computer system, second input data of a second interaction with a portion of the first seed data displayed in the graphical interface, wherein the second input data indicates an operation to modify the portion of the first seed data;
modifying the portion of the first seed data based on the operation indicated by the second input data;
obtaining, by the computer system, third input data of a third interaction with the graphical interface, wherein the third input data identifies a second memory storage location of second seed data;
comparing the modified seed data to the second seed data; and
loading the modified seed data to a third memory storage location, wherein an application executes using the modified seed data loaded at the third memory storage location.

2. The method of claim 1, wherein the second interaction with the portion of the first seed data causes a list of interactive elements to be displayed in the graphic interface, wherein each interactive element in the list of the interactive elements is associated with a modification operation to modify the portion of the first seed data, the modification operation including: deleting the portion of the first seed data, changing the portion of the first seed data, or inserting fourth seed data in the portion of the first seed data.

3. The method of claim 1, wherein the portion of the first seed data is a first portion of the first seed data, and wherein the portion of the first seed data is modified by at least one of: inserting a second portion of the first seed data in the portion of the first seed data, changing the portion of the first seed data, or deleting the portion of the first seed data.

4. The method of claim 1, wherein the first input data includes information identifying a database query statement, and wherein the first seed data is accessed based on the database query statement.

5. The method of claim 1, wherein the first memory storage location corresponds to a first location in a database of a memory storage device of the computer system, and wherein the second memory storage location corresponds to a second location in the database of the memory storage device of the computer system.

6. The method of claim 1, wherein the first seed data includes one or more static values, one or more error messages, one or more lookup values, non-transactional data, or a combination thereof.

7. The method of claim 1, wherein the first memory storage location indicates a location of a data file stored at the computer system, wherein the first seed data is stored in the data file in an extended markup language (XML) format, and wherein the second memory storage location corresponds to a location in a database of a memory storage device.

8. The method of claim 1, wherein the computer system is a first computer system that includes the first memory storage location, and wherein the second memory storage location is located at a second computer system that is different from the first computer system.

9. The method of claim 1, wherein information associated with accessing the first seed data is displayed in the graphic interface, and wherein the second memory storage location indicates a location of a log file stored at the computer system.

10. The method of claim 1, wherein the first memory storage location indicates a location of a first data file stored at the computer system, wherein the first seed data is stored in the first data file in a first extended markup language (XML) format, wherein the third memory storage location indicates a location of a second data file stored at the computer system, and wherein the second seed data is stored in the second data file in a second XML format.

11. The method of claim 1, further comprising:
generating split seed data by splitting the first seed data based on a seed data rule indicated by fourth input data received using the graphic interface, and wherein the first memory storage location is associated with a data file stored at the computer system.

12. A computing system, comprising:
a processor; and
a memory readable by the processor and storing a set of instructions which, when executed by the processor, cause the processor to perform a method comprising:
obtaining first input data of a first interaction with a graphical interface, wherein the first input data identifies a first memory storage location of first seed data, and wherein seed data includes data used in execution of an application;
displaying, in the graphical interface, the first seed data accessed from the first memory storage location identified by the first input data;
obtaining second input data of a second interaction with a portion of the first seed data displayed in the graphical interface, wherein the second input data indicates an operation to modify the portion of the first seed data;
modifying the portion of the first seed data based on the operation indicated by the second input data;
obtaining third input data of a third interaction with the graphical interface, wherein the third input data identifies a second memory storage location of second seed data;
comparing the modified seed data to the second seed data; and
loading the modified seed data to a third memory storage location, wherein an application executes using the modified seed data loaded at the third memory storage location.

13. The computing system of claim 12, wherein the processor and memory are included in a web computer system, and wherein the first memory storage location and the second memory storage location are in a memory storage system coupled to the web computer system.

14. The computing system of claim 12, wherein the method further comprises:
obtaining fourth input data of a fourth interaction with the graphical interface, wherein the fourth input data identifies an attribute of the first seed data, wherein the first seed data is accessed based on the attribute, wherein the portion of the first seed data is modified by removing one or more entries of data in the first seed data.

15. A computer-readable memory comprising a set of instructions stored thereon which, when executed by a processor, cause the processor to perform a method comprising:
obtaining, by a computer system, first input data of a first interaction with a graphical interface, wherein the first input data identifies a first memory storage location of first seed data, and wherein seed data includes data used in execution of an application;
displaying, in the graphical interface, the first seed data accessed from the first memory storage location identified by the first input data;
obtaining, by the computer system, second input data of a second interaction with a portion of the first seed data displayed in the graphical interface, wherein the second input data indicates an operation to modify the portion of the first seed data;
modifying the portion of the first seed data based on the operation indicated by the second input data;
obtaining, by the computer system, third input data of a third interaction with the graphical interface, wherein the third input data identifies a second memory storage location of second seed data;
comparing the modified seed data to the second seed data; and
loading the modified seed data to a third memory storage location, wherein an application executes using the modified seed data loaded at the third memory storage location.

16. The computer-readable memory of claim 15, wherein the first memory storage location indicates a location of a data file stored at the computer system, wherein the first seed data is stored in the data file, wherein the second memory storage location corresponds to a location in a database of a memory storage device, and wherein the memory storage device is associated with a second computer system that is different from the computer system.

* * * * *

UNITED STATES PATENT AND TRADEMARK OFFICE
CERTIFICATE OF CORRECTION

PATENT NO. : 9,507,751 B2  Page 1 of 1
APPLICATION NO. : 14/062850
DATED : November 29, 2016
INVENTOR(S) : Handa et al.

It is certified that error appears in the above-identified patent and that said Letters Patent is hereby corrected as shown below:

In the Claims

In Column 28, Line 2, in Claim 1, after "method" insert -- , --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*